United States Patent
Vrudhula et al.

(10) Patent No.: US 11,356,100 B2
(45) Date of Patent: Jun. 7, 2022

(54) FPGA WITH RECONFIGURABLE THRESHOLD LOGIC GATES FOR IMPROVED PERFORMANCE, POWER, AND AREA

(71) Applicants: Sarma Vrudhula, Chandler, AZ (US); Ankit Wagle, Tempe, AZ (US)

(72) Inventors: Sarma Vrudhula, Chandler, AZ (US); Ankit Wagle, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 17 days.

(21) Appl. No.: 16/926,718

(22) Filed: Jul. 12, 2020

(65) Prior Publication Data

US 2021/0013886 A1    Jan. 14, 2021

Related U.S. Application Data

(60) Provisional application No. 62/873,546, filed on Jul. 12, 2019.

(51) Int. Cl.
*H03K 19/17728* (2020.01)
*G06F 30/343* (2020.01)
(Continued)

(52) U.S. Cl.
CPC ..... *H03K 19/17728* (2013.01); *G06F 30/343* (2020.01); *G06F 30/347* (2020.01);
(Continued)

(58) Field of Classification Search
CPC ....... H03K 19/17728; H03K 19/17796; H03K 19/17744; G06F 30/343; G06F 30/347; G06F 2119/06; G06F 30/34
(Continued)

(56) References Cited

U.S. PATENT DOCUMENTS 6,781,885 B1    8/2004   Park et al.
7,630,852 B1   12/2009   Ghanta et al.
(Continued)

FOREIGN PATENT DOCUMENTS

WO    2014151323 A1    9/2014
WO    2021011394 A1    1/2021

OTHER PUBLICATIONS

Abusultan et al., "A Flash-based Digital Circuit Design Flow," 2016 IEEE/ACM International Conference on Computer-Aided Design (ICCAD), Nov. 7-10, 2016, Austin, TX, 6 pages.
(Continued)

*Primary Examiner* — Don P Le
(74) *Attorney, Agent, or Firm* — Withrow & Terranova, P.L.L.C.

(57) ABSTRACT

A field-programmable gate array (FPGA) with reconfigurable threshold logic gates for improved performance, power, and area (PPA) is provided. This disclosure describes a new architecture for an FPGA, referred to as threshold logic FPGA (TLFPGA), that integrates a conventional lookup table (LUT) with a complementary metal-oxide-semiconductor (CMOS) digital implementation of a binary perceptron, referred to as a threshold logic cell (TLC). The TLFPGA design described herein, combined with a new logic mapping algorithm that exploits the presence of both conventional LUTs and TLCs within the basic logic element (BLE) block, achieves significant improvements in all the metrics of PPA. The TLCs of embodiments described herein are capable of implementing a complex threshold function, which if implemented using conventional gates would require several levels of logic gates. The TLCs only require seven static random-access memory (SRAM) cells and are significantly faster than the conventional LUTs.

15 Claims, 15 Drawing Sheets

(51) Int. Cl.
  *H03K 19/17796* (2020.01)
  *H03K 19/17736* (2020.01)
  *G06F 30/347* (2020.01)
  *G06F 119/06* (2020.01)
(52) U.S. Cl.
  CPC . *H03K 19/17744* (2013.01); *H03K 19/17796* (2013.01); *G06F 2119/06* (2020.01)
(58) Field of Classification Search
  USPC ..................................................... 326/38–41
  See application file for complete search history.

(56) References Cited

U.S. PATENT DOCUMENTS

| | | | |
|---|---|---|---|
| 8,164,359 B2 | 4/2012 | Leshner et al. | |
| 8,181,133 B2 | 5/2012 | Gowda et al. | |
| 8,601,417 B2 | 12/2013 | Gowda et al. | |
| 8,723,575 B1* | 5/2014 | Ooi ...................... | H03H 11/265 327/262 |
| 8,832,614 B2 | 9/2014 | Vrudhula et al. | |
| 9,306,151 B2 | 4/2016 | Vrudhula et al. | |
| 9,356,598 B2 | 5/2016 | Vrudhula et al. | |
| 9,466,362 B2 | 10/2016 | Yu et al. | |
| 9,473,139 B2 | 10/2016 | Vrudhula et al. | |
| 9,490,815 B2 | 11/2016 | Vrudhula et al. | |
| 9,876,503 B2 | 1/2018 | Vrudhula et al. | |
| 9,933,825 B2 | 4/2018 | Hanumaiah et al. | |
| 9,934,463 B2 | 4/2018 | Seo et al. | |
| 10,133,323 B2 | 11/2018 | Hanumaiah et al. | |
| 10,250,236 B2 | 4/2019 | Vrudhula et al. | |
| 10,447,249 B2 | 10/2019 | Vrudhula et al. | |
| 10,551,869 B2 | 2/2020 | Vrudhula et al. | |
| 10,795,809 B2 | 10/2020 | Yang et al. | |
| 2006/0233006 A1* | 10/2006 | Fant .................... | G06F 15/8023 365/1 |
| 2016/0261749 A1* | 9/2016 | Femal ..................... | G10L 25/78 |
| 2019/0340027 A1* | 11/2019 | Brewer ................. | G06F 9/3009 |
| 2019/0340154 A1* | 11/2019 | Brewer ................. | G06F 9/3009 |
| 2019/0340155 A1* | 11/2019 | Brewer ................. | G06F 9/3009 |
| 2020/0160159 A1 | 5/2020 | Azari et al. | |

OTHER PUBLICATIONS

Abusultan et al., "Implementing Low Power Digital Circuits using Flash Devices," 2016 IEEE 34th International Conference on Computer Design (ICCD), Oct. 2-5, 2016, Scottsdale, AZ, pp. 109-116.
Ahmed et al., "The effect of LUT and cluster size on deep-submicron FPGA performance and density," IEEE Transactions on Very Large Scale Integration (VLSI) Systems, vol. 12, No. 3, Apr. 5, 2004, pp. 288-298.
Amaru et al., "Majority-Inverter Graph: A New Paradigm for Logic Optimization," IEEE Transactions on Computer-Aided Design of Integrated Circuits and Systems, vol. 35, No. 5, Oct. 7, 2015, pp. 806-819.
An et al., "The threshold voltage fluctuation of one memory cell for the scaling-down NOR flash," 2010 2nd IEEE International Conference on Network Infrastructure and Digital Content, Sep. 24-26, 2010, Beijing,China, pp. 433-436.
Anderson et al., "Raising FPGA Logic Density Through Synthesis-Inspired Architecture," IEEE Transactions on Verly Large Scale Integration (VLSI) Systems, vol. 20, No. 3, Feb. 10, 2011, pp. 537-550.
Beiu V., "A survey of perceptron circuit complexity results," Proceedings of the International Joint Conference on Neural Networks, IEEE, Jul. 20-24, 2003, Portland, OR, pp. 989-994.
Beiu, V. et al., "Differential Implementations of Threshold Logic Gates," Proceedings of the 2003 International Symposium on Signals, Circuits and Systems (SCS 2003), vol. 2, Jul. 10-11, 2003, Romania, IEEE, pp. 489-492.
Beraudo et al., "Timing optimization of FGPA placements bylogic replication," Proceedings 2003, Design Automation Conference (IEEE Cat No. 03CH37451), Jun. 2-6, 2003, Anaheim, CA, pp. 196-201.
Betz et al. "VPR: A New Packing, Placement and Routing Tool for FPGA Research," Proceedings of the 7th International Workshop on Field-Programable Logic and Applications, Lecture Notes in Computer Science vol. 1304, Springer-Verlag Berlin Heidelberg, Sep. 1997, pp. 213-222.
Boboila et al., "Write Endurance in Flash Drives: Measurements and Analysis," Proceedings of the 8th USENIX conference on file and storage locations, Feb. 2010, 10 pages.
Bohossian et al.," Programmable neural logic," 1997 Proceedings Second Annual IEEE International Conference an Innovative Systems in Silicon, Oct. 8-10, 1997, Austin, TX, pp. 13-21.
Bohossian et al., "Programmable neural logic," IEEE Transactions on Components, Packaging, and Manufacturing Technology: Part B, vol. 21, No. 4, Nov. 1998, pp. 346-351.
Brayton et al., "ABC: An Academic Industrial-strength Verification Tool," International Conference on Computer Aided Verification, Lecture Notes in Computer Science, vol. 6174, Springer-Verlag Berlin Heidelberg, Jul. 15-19, 2010, Edinburgh, United Kingdom, pp. 24-40.
Cai et al., "Threshold voltage distribution in MLC NAND flash memory: Characterization, analysis, and modeling," 2013 Design, Automation, & Test in Europe Conference & Exhibition, IEEE, Mar. 18-22, 2013, Grenoble, France, 6 pages.
Celinski et al., "State of the art in CMOS threshold logic VLSI gate implementations and systems," Proceeding of SPIE vol. 5117, VLSI Circuits and Systems, Apr. 21, 2003, pp. 53-64.
Choi et al., "Device considerations for high density and highly reliable 3D NAND flash cell in near future," 2012 International Electron Devices Meeting, IEEE, Dec. 10-13, 2012, San Francisco, CA, 4 pages.
Cong et al., "FlowMap: an optimal technology mapping algorithm for delay optimization in lookup-table based FPGA designs," IEEE Transactions on Computer-Aided Design of Integrated Circuits and Systems, vol. 13, No. 1, Jan. 1994, pp. 1-12.
Farooq et al., "Chapter 2: FPGA Architectures:An Overview," Tree-based Heterogeneous FPGA Architectures Application Specific Exploration and Optimization, Springer-Verlag New York, 2012, pp. 7-48.
Feng et al., "Improving FPGA performance with a S44 Lut structure," Proceedings of the 2018 ACM/SIGDA International Symposium on Field-Programmable Gate Arrays, Feb. 2018, pp. 61-66.
Fowler et al., "Electron Emission in Intense Electric Fields," Proceedings of the Royal Society of London, Seria A, Containing Papersofa Mathematical and Physical Character, vol. 119, No. 781, May 1, 2928, pp. 173-181.
Globalfoundries, "14LPP: 14nm FinFET Technology," 2018, 2 pages.
He et al., "Energy Efficient Reconfigurable Threshold Logic Circuit with Spintronic Devices," IEEE Transactions on Emerging Topics in Computing, vo. 5, No. 2, Dec. 9, 2016, pp. 223-237.
Intel, "Cyclone V Device Overview," CV-51001, May 7, 2018, 37 pages.
Jung et al., "A group-based wear-leveling algorithm for large-capacity flash memory storage systems," Proceedings of the 2007 Internationl Conference on Compilers, architecture, and synthesis for embedded systems, Sep. 2007, pp. 160-164.
Kaya et al., "Reconfigurable threshold logic gates with nanoscale DG-MOSFETs," Solid-State Electronics, vol. 51, No. 10, Oct. 2007, pp. 1301-1307.
Kim et al., "Synthesizable FGPA fabrics targetable by the Verilog-to-Routing (VTR) CAD flow," 2015 25th International Conference on Field Programmable Logic and Applications, IEEE, Sep. 2-4, 2015, London, UK, 8 pages.
Kulkarni et al., "A fast, energy efficient, field programmable threshold-logic array," 2014 International Conference on Field Programmable Technology (FPT), IEEE, Dec. 10-12, 2014, Shanghai, China, pp. 300-305.

(56) References Cited

OTHER PUBLICATIONS

Kulkarni et al., "Reducing power, leakage, and area of standard-cell asics using threshold logic flip-flops," IEEE Transactions on Very Large Scale Integration (VLSI) Systems, vol. 24, No. 9, Mar. 10, 2016, pp. 2873-2886.
Kumar et al., "A novel design of a memristor-based look-up table (LUT) for FPGA," 2014 IEEE Asia Pacific Conference on Circuits and Systems, Nov. 17-20, 2014, Ishigaki, Japan, pp. 703-706.
Kuon et al., "Measuring the Gap Between FPGAs and ASICs," IEEE Transactions on Computer-Aided Design of ntegrated Circuits and Systems, vol. 26, No. 2, Jan. 11, 2007, 10 pages.
Liu, H. J., "Archipelago—An Open Source FPGA with Toolflow Support," Technical Report No. UCB/EECS-2014-43, EECS Department, University of California, Berkeley, May 1, 2014, 80 pages.
Ma et al., "An automatic RTL compiler for high-throughput FPGA implementation of diverse deep convolutional neural networks," 2017 27th International Conference on Field Programmable Logic and Applications, IEEE, Sep. 4-8, 2017, Ghent, Belgium, 8 pages.
Ma et al., "Optimizing the Convolution Operation to Accelerate Deep Neural Networks on FPGA," IEEE Transactions an Very Large Scale Integration (VLSI) Systems, vol. 26, No. 7, Apr. 3, 2018, pp. 1354-1367.
Microsemi, "UG0680 User Guide: PolarFire FGPA Fabric," published on Jan. 1, 2017, last updated Apr. 28, 2020, 108 pages.
Mozaffari et al., Maximizing the number of threshold logic functions using resistive memory, IEEE Transactions on Nanotechnology, vol. 17, No. 5, Apr. 2, 2018, pp. 897-905.
Nukala et al., "Spintronic Threshold Logic Array (STLA)—a compact, low leakage, non-volatile gate array architecture," 2012 IEEE/ACM International Symposium on Nanoscale Architectures (NANOARCH), Jul. 4-6, 2012, Amsterdam, Netherlands, pp. 188-195.
Qureshi et al., "Enhancing lifetime and security of PCM-based Main Memory with Start-Gap Wear Leveling," 2009 42nd Annual IEEE/ACM International Symposium on Microarchitecture (MICRO), Dec. 12-16, 2009, New York, NY, pp. 14-23.
Raspa et al., "A framework with cloud integration for CNN acceleration on FPGA devices," 2018 IEEE International Parallel and Distributed Processing Symposium Workshops, May 21-25, 2018, Vancouver, BC, pp. 170-177.
Ray et al., "Mapping into LUT structures," Proceedings of the Conference on Design, Automation and Test in Europe, Mar. 2012, pp. 1579-1584.
Rodriguez-Villegas et al., "High-speed low-power logic gates using floating gates," 2002 IEEE International Symposium on Circuits and Systems, Proceedings (Cat. No. 02CH37353), May 26-29, 2002, Phoenix, AZ, pp. 389-392.
Rosenblatt, F., "The perceptron: A probabilistic model for information storage and organization in the brain," Psychological Review, vol. 65, No. 6, 1958, pp. 386-408.
Fang et al., "A Study on the Programming Structures for RRAM-Based FPGA Architectures," IEEE Transactions on Circuits and Systems I: Regular Papers, vol. 63, No. 4, Mar. 10, 2016, pp. 503-516.
Wagle, A. et al., "Threshold Logic in a Flash," 2019 IEEE 37th International Conference on Computer Design (ICCD), arXiv:1910 04910v1 [cs ET], Oct. 10, 2019, 9 pages.
Williams et al., "Architecture and Circuit Design of an All-Spintronic FPGA," Proceedings of the 2018 ACM/SIGDA International Symposium on Field-Programmable Gate Arrays, Feb. 25-27, 2018, Monterey, CA, pp. 41-50.
Xilinx, "7 Series FPGAs Confugurable Logic Block: User Guide," UG474 (v1.8), Sep. 27, 2016, 74 pages.
Yang et al., "Integration of threshold logic gates with RRAM devices for energy efficient and robust operation," 2014 IEEE/ACM International Symposium on Nanoscale Architectures (NANOARCH), Jul. 8-10, 2014, Paris, France, pp. 39-44.
Yang et al., U.S. Appl. No. 17/063,185, filed Oct. 5, 2020.
Zgheib et al., "Evaluating FPGA clusters under wide ranges of design parameters," 2017 27th International Conference on Field Programmable Logic and Applications (FPL), IEEE, Sep. 4-8, 2017, Ghent, Belgium, 8 pages.
Zhou et al., "An FPGA-based accelerator implementation for deep convolutional neural networks," 2015 4th International Conference on Computer Science and Network Technology, IEEE, Dec. 19-20, 2015, Harbin, China, pp. 829-832.
International Search Report and Written Opinion for International Patent Application No. PCT/US2020/041653, dated Oct. 7, 2020, 9 pages.

* cited by examiner

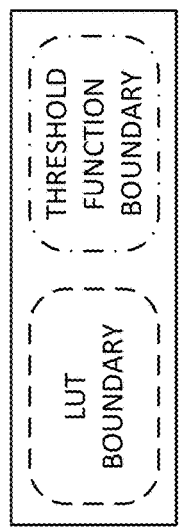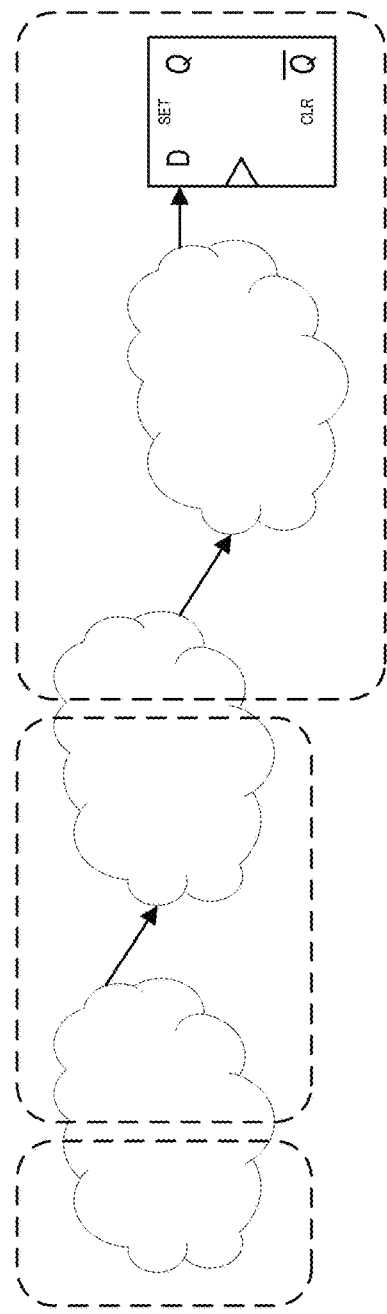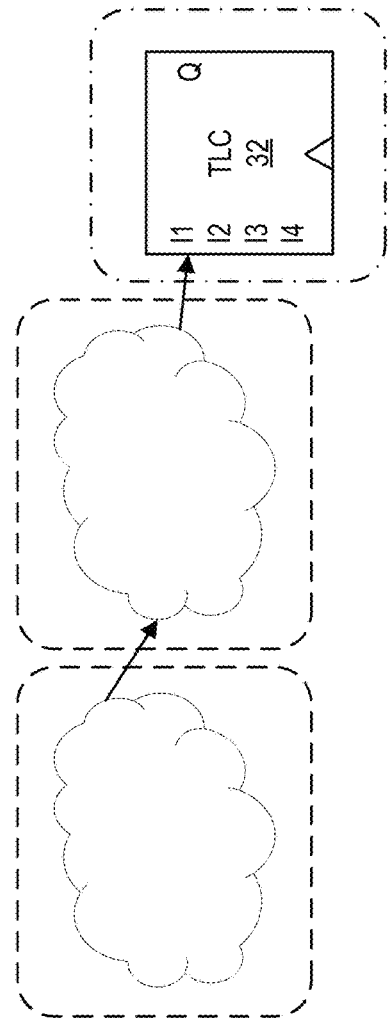
FIG. 8A
FIG. 8B

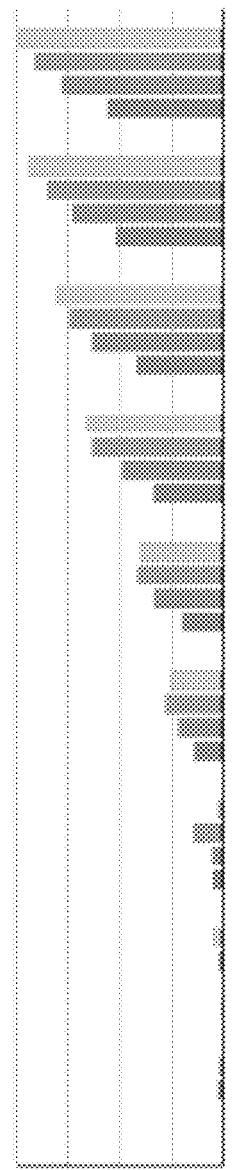
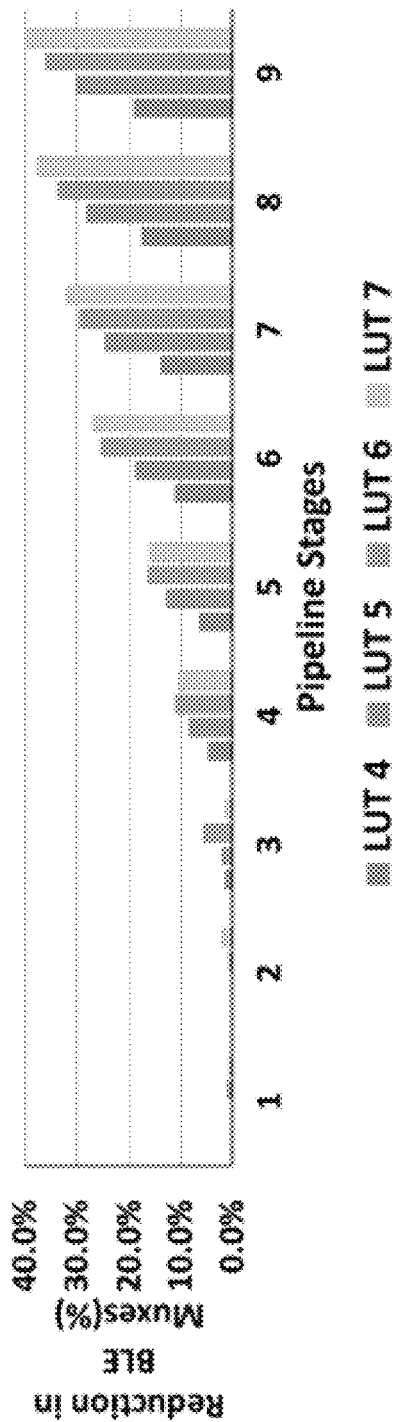
FIG. 9A
FIG. 9B

FPGA WITH RECONFIGURABLE THRESHOLD LOGIC GATES FOR IMPROVED PERFORMANCE, POWER, AND AREA

RELATED APPLICATIONS

This application claims the benefit of provisional patent application Ser. No. 62/873,546, filed Jul. 12, 2019, the disclosure of which is hereby incorporated herein by reference in its entirety.

GOVERNMENT SUPPORT

This invention was made with government support under 1701241 awarded by the National Science Foundation. The government has certain rights in the invention.

FIELD OF THE DISCLOSURE

This application relates to programmable logic devices.

BACKGROUND

A field-programmable gate array (FPGA) is an integrated circuit which allows for configuration of logic circuits after manufacture, also referred to as field programmability. Traditionally, the attractiveness of FPGAs was primarily due to their reconfigurability in the field, which provided the flexibility of software and the high performance and energy-efficiency of hardware, when compared with microprocessor-based systems. FPGAs are also ideal for rapid prototyping of designs.

However, when compared to application-specific integrated circuits (ASICs), FPGAs are still an order of magnitude inferior in performance, power, and area (PPA). Nevertheless, the extremely high costs of ASICs, especially, in sub-$16/14$ nanometer (nm) technologies, combined with shrinking time-to-market, and the more recent drive to implement compute-intensive applications like convolutional neural networks (CNNs) and deep neural networks (DNNs) on FPGAs have all placed added emphasis on improving the energy-efficiency of FPGAs.

FIG. 1A is a schematic diagram of an exemplary FPGA logic tile 10 for a traditional FPGA. The FPGA logic tile 10 includes a programmable basic logic element (BLE) block 12, as well as configuration registers 14 and intra-tile interconnect resources 16 (e.g., a set of multiplexers (MUXs)) which are used to program the BLE block 12. Many FPGAs are implemented with an array of lookup tables (LUTs), which may have four, five, six, or some other number of inputs. Generically, a LUT with k inputs can be referred to as a LUT-K 18. In the FPGA tile cluster 10 of FIG. 1A, the BLE block 12 includes four LUT-Ks 18.

An FPGA includes an array of such FPGA logic tiles 10, and each FPGA logic tile 10 further includes inter-tile interconnect resources 20 (e.g., MUXs and/or switches). The LUT-Ks 18 provide flexibility in the programmability of the FPGA, but each additional LUT-K 18 in the FPGA logic tile 10 comes at a heavy cost of area, power, and performance.

FIG. 1B is a schematic diagram of an alternative FPGA logic tile 10 for a traditional FPGA. In the FPGA logic tile 10 of FIG. 1B, the BLE block 12 includes ten LUT-Ks 18.

Improvements in the PPA of FPGAs to date have been achieved through the use of new design mapping algorithms, and by modifying the architecture of the basic computational block of an FPGA—the LUT. Advances in technology mapping have taken place over several decades, and have been incorporated into most of the commercial FPGAs. Comparatively less has been done on exploring alternate architectures for the LUT.

The most common approach to examining alternate architectures for an LUT is based on varying the size of their support set and/or changing the set of functions each can realize. Research in new circuit architectures for LUTs and programmable interconnects employing emerging device technologies such as resistive random access memory (RRAM), spin-transfer torque magnetic tunnel junctions (STT-MTJs) and discrete wavelet transforms (DWTs) have also been reported. Although these technologies are still under development and not yet viable commercially, existing literature provides compelling evidence that they have the potential for realizing ultra-compact and energy-efficient FPGAs.

SUMMARY

A field-programmable gate array (FPGA) with reconfigurable threshold logic gates for improved performance, power, and area (PPA) is provided. This disclosure describes a new architecture for an FPGA, referred to as threshold logic FPGA (TLFPGA), that integrates a conventional lookup table (LUT) with a complementary metal-oxide-semiconductor (CMOS) digital implementation of a binary perceptron, referred to as a threshold logic cell (TLC). The TLFPGA design described herein, combined with a new logic mapping algorithm that exploits the presence of both conventional LUTs and TLCs within the basic logic element (BLE) block, achieves significant improvements in all the metrics of PPA.

The TLCs of embodiments described herein are capable of implementing a complex threshold function, which if implemented using conventional gates would require several levels of logic gates. The TLCs only require seven static random-access memory (SRAM) cells and are significantly faster than the conventional LUTs. An example implementation of the proposed FPGA architecture has been done using 28 nanometer (nm) fully-depleted silicon-on-insulator (FDSOI) standard cells and has been evaluated using International Symposium on Circuits and Systems (ISCAS) benchmarks ISCAS-85 and ISCAS-89, as well as a few large industrial designs.

Evaluations demonstrate that the proposed architecture can be used to get an average reduction of 18.1% in configuration registers, 18.1% reduction in multiplexer (MUX) count, 12.3% in BLE area, 16.3% in BLE power, 5.9% improvement in operating frequency, with a slight reduction in track count, routing area and routing power. The improvements are also demonstrated on the physically designed version of the architecture.

An exemplary embodiment provides a TLFPGA, comprising: a plurality of logic tiles, each logic tile comprising: a LUT; a TLC; and configuration registers adapted to store a logical configuration for the LUT and the TLC; wherein the configuration registers are field programmable.

Another exemplary embodiment provides a field-programmable integrated circuit, comprising: a plurality of BLEs, comprising at least one TLC programmable to perform a Boolean threshold function; a plurality of multiplexers providing programmable interconnection between the plurality of BLEs; and configuration registers configured to program the plurality of BLEs and the plurality of multiplexers to perform a logic function.

Another exemplary embodiment provides a method for programming a TLFPGA, comprising: obtaining a gate level netlist for a circuit design; performing a TLC mapping of the gate level netlist; and performing a LUT mapping of the gate level netlist after the TLC mapping to produce a mapped netlist.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 8A illustrates a circuit implementation cost in a traditional TLFPGA.

FIG. 8B illustrates a circuit implementation cost in the TLFPGA of FIG. 2.

FIG. 9A is a graphical representation of an average percentage reduction in BLE configuration registers in a TLFPGA according to FIG. 3B as compared to a traditional FPGA according to FIG. 1B for varying lookup table (LUT) sizes and pipeline stages.

FIG. 9B is a graphical representation of an average percentage reduction in multiplexers (MUXs) in the TLFPGA of FIG. 9A.

DETAILED DESCRIPTION

Figure 1A:
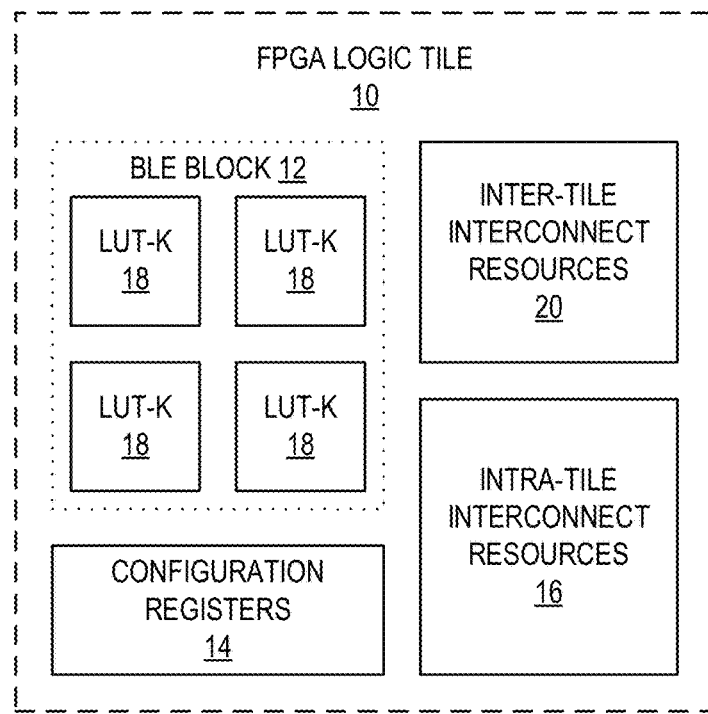
FIG. 1A is a schematic diagram of an exemplary field-programmable gate array (FPGA) logic tile for a traditional FPGA.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A field-programmable gate array (FPGA) with reconfigurable threshold logic gates for improved performance, power, and area (PPA) is provided. This disclosure describes a new architecture for an FPGA, referred to as threshold logic FPGA (TLFPGA), that integrates a conventional lookup table (LUT) with a complementary metal-oxide-semiconductor (CMOS) digital implementation of a binary perceptron, referred to as a threshold logic cell (TLC). The TLFPGA design described herein, combined with a new logic mapping algorithm that exploits the presence of both conventional LUTs and TLCs within the basic logic element (BLE) block, achieves significant improvements in all the metrics of PPA.

The TLCs of embodiments described herein are capable of implementing a complex threshold function, which if implemented using conventional gates would require several levels of logic gates. The TLCs only require seven static random-access memory (SRAM) cells and are significantly faster than the conventional LUTs. An example implementation of the proposed FPGA architecture has been done using 28 nanometer (nm) fully-depleted silicon-on-insulator (FDSOI) standard cells and has been evaluated using International Symposium on Circuits and Systems (ISCAS) benchmarks ISCAS-85 and ISCAS-89, as well as a few large industrial designs.

Evaluations demonstrate that the proposed architecture can be used to get an average reduction of 18.1% in configuration registers, 18.1% reduction in multiplexer (MUX) count, 12.3% in BLE area, 16.3% in BLE power, 5.9% improvement in operating frequency, with a slight reduction in track count, routing area and routing power. The improvements are also demonstrated on the physically designed version of the architecture.

I. Introduction

The architecture of a TLFPGA favors highly pipelined circuits, i.e., the improvements in PPA increase with more pipeline stages—a characteristic that is not generally found when using conventional logic structures, where increasing performance is often achieved at the expense of area and/or power. To ensure an accurate evaluation of the proposed architecture, FPGAs and TLFPGAs for different sizes of LUTs were designed down to the layout level, using the public domain FPGA design tool Versatile Place and Route (VPR), OpenFPGA, and commercial tools from Cadence Inc., including Genus® for synthesis and Innovus® for placement and routing.

All estimates for performance and power are based on simulation of netlists with all parasitics extracted from the layouts. The circuit benchmarks that were mapped on to the FPGAs and TLFPGAs include the traditional set of ISCAS-85, as well as larger and more complex function blocks from OpenCores.

The description provided herein is organized as follows: Section II describes the TLFPGA architecture and compares LUT-n for n=4, 5, 6, 7 with a TLC-7 in terms of area, delay and power. Section III describes the design flow that results in a complete layout of the FPGA and TLFPGA. Sections IV and V describe a logic mapping algorithm that looks for subcircuits which are threshold functions that can be implemented by a TLC-7. Extensive evaluation results using standard benchmark circuits and large complex function blocks are presented in Section VI. Section VII describes a computer system which may be used to perform any of the methods or functions described herein.

II. TLFPGA Architecture

Figure 2:
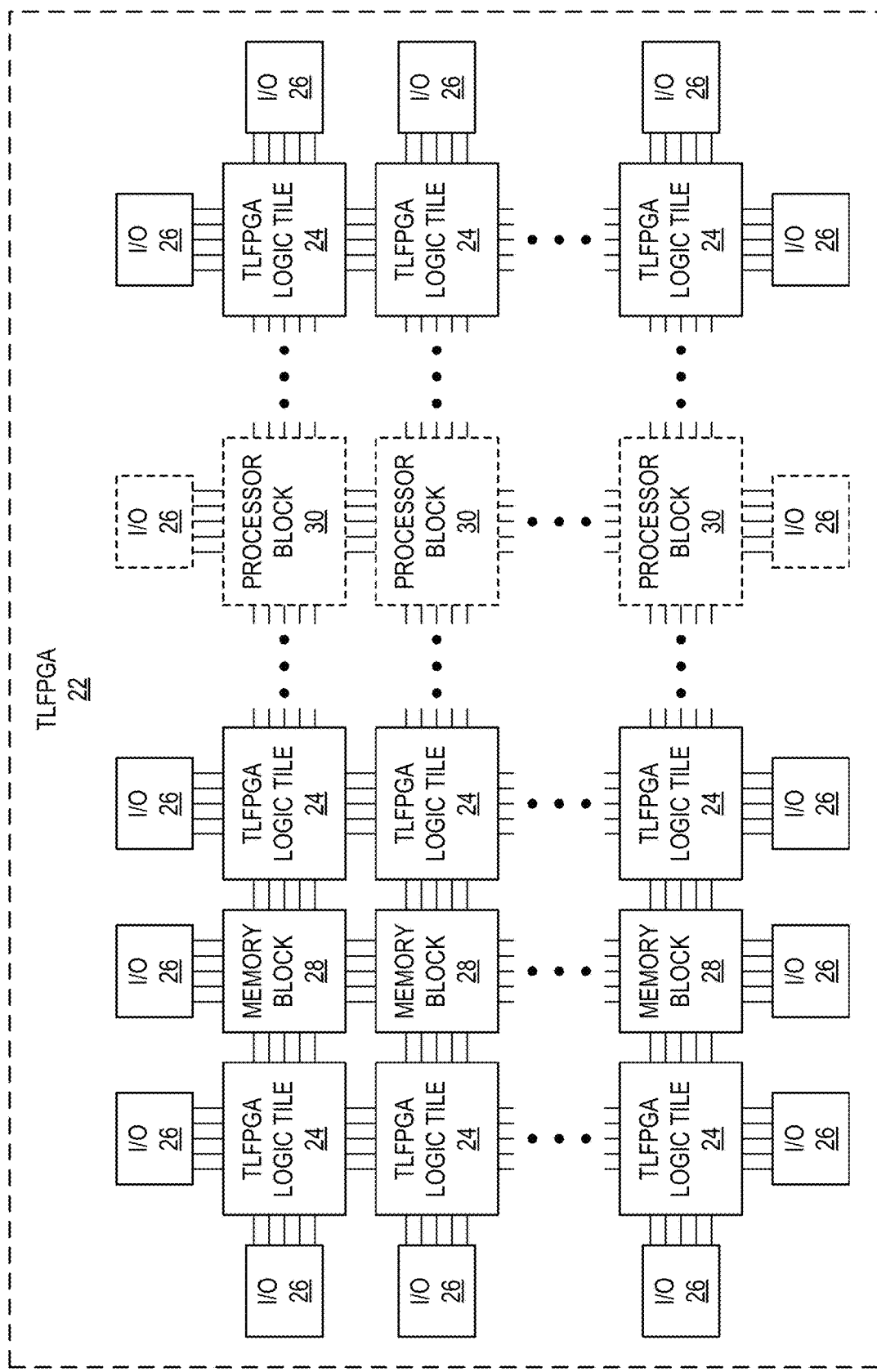
FIG. 2 is a schematic block diagram of an exemplary threshold logic FPGA (TLFPGA) according to embodiments described herein.

FIG. 2 is a schematic block diagram of an exemplary TLFPGA 22 according to embodiments described herein. The TLFPGA 22 is an integrated circuit (IC) which includes an array of TLFPGA logic tiles 24. As described further below with respect to FIGS. 3A and 3B, each TLFPGA logic tile 24 includes one or more programmable TLCs, as well as programmable interconnections between the TLFPGA logic tiles 24. An array of input/output (I/O) blocks 26 provides connection for field programmability and operation of the TLFPGA 22.

The exemplary TLFPGA 22 in this embodiment includes one or more memory blocks 28, which can include volatile memory (e.g., read-only memory (ROM), flash memory, dynamic random access memory (DRAM), synchronous DRAM (SDRAM), etc.) and/or non-volatile memory (e.g., flash memory, SRAM, etc.). The memory blocks 28 may store instructions, inputs, results, and so on in accordance with the configuration of the TLFPGA 22.

In some examples, the TLFPGA 22 may optionally include one or more additional processor blocks 30, which may be digital signal processor (DSP) blocks, discrete gate or transistor logic, discrete hardware components, or any combination thereof designed to perform functions of the TLFPGA 22. In some examples, the processor blocks 30 are also field-programmable in a manner similar to the TLFPGA logic tiles 24.

Figure 3A:
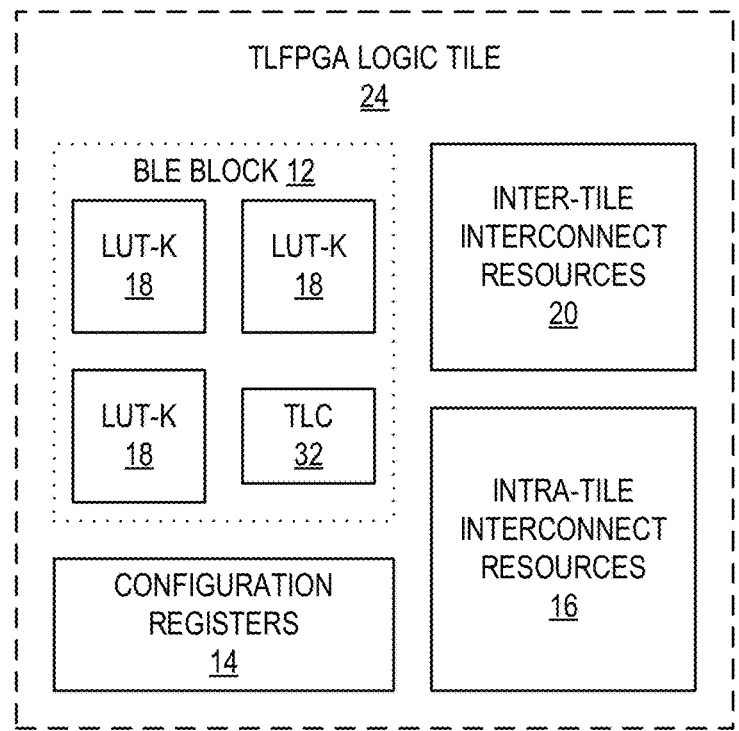
FIG. 3A is a schematic diagram of an exemplary TLFPGA logic tile for the TLFPGA of FIG. 2.

FIG. 3A is a schematic diagram of an exemplary TLFPGA logic tile 24 for the TLFPGA 22 of FIG. 2. Similar to the traditional FPGA logic tile 10 of FIGS. 1A and 1B, the TLFPGA logic tile 24 includes a programmable BLE block 12, as well as configuration registers 14 and intra-tile interconnect resources 16 (e.g., a set of MUXs) which are used to program the BLE block 12. However, the TLFPGA 22 uses a novel logic tile architecture where the BLE block 12 includes one or more TLCs 32. In an exemplary aspect, the BLE block 12 includes a cluster of LUT-Ks 18 and TLCs 32. In the TLFPGA logic tile 24 of FIG. 3A, the BLE block 12 includes three LUT-Ks 18 and one TLC 32. In some examples, the BLE block 12 can be referred to as an adaptive logic module (ALM) block, where the LUT-Ks 18 and TLCs 32 are referred to as ALMs.

Both LUT-Ks 18 and TLCs 32 are BLEs capable of implementing Boolean functions. Compared to a standard LUT cell, the proposed TLC 32 has smaller overall delay, area and power consumption when implementing the same function. The TLFPGA implementation shows significant improvement in area and power without sacrificing performance, as compared to the traditional FPGA implementation of FIGS. 1A and 1B. The TLFPGA logic tile 24 further includes inter-tile interconnect resources 20 (e.g., MUXs and/or switches).

Figure 3B:
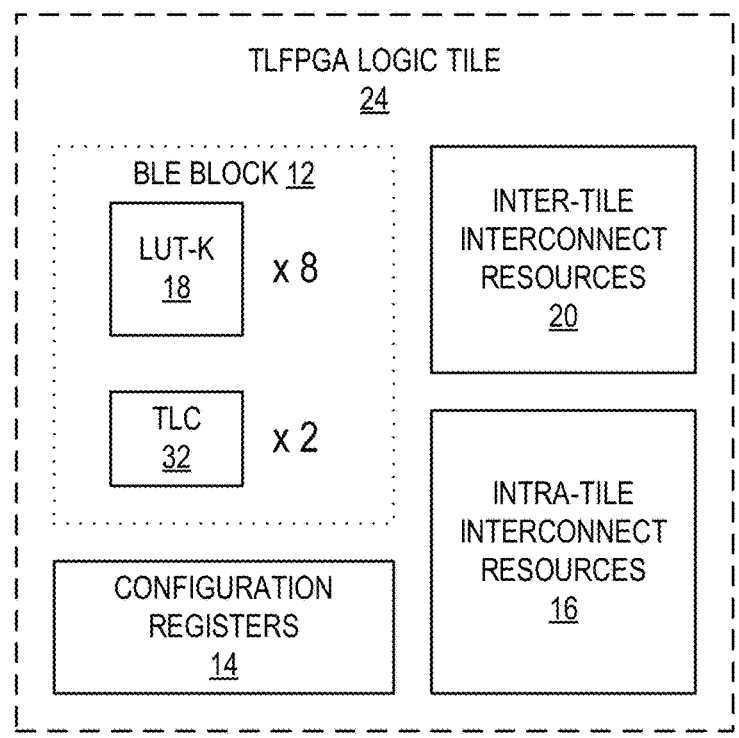
FIG. 3B is a schematic diagram of an alternative TLFPGA logic tile for the TLFPGA of FIG. 2.

FIG. 3B is a schematic diagram of an alternative TLFPGA logic tile 24 for the TLFPGA 22 of FIG. 2. In the TLFPGA logic tile 24 of FIG. 3B, the BLE block 12 includes eight LUT-Ks 18 and two TLCs 32.

With continuing reference to FIGS. 3A and 3B, the TLC 32 is a digital CMOS circuit implementation of a binary perceptron, whose function is referred to as a threshold function or a linearly separable function. A unate Boolean function $f(x_1, x_2, \ldots, x_n)$ is called a threshold function if there exist weights $w_i$ for i=1, 2, . . . , n and a threshold T such that:

$$f(x_1, x_2, \ldots, x_n) = 1 \Leftrightarrow \Sigma_{i=1}^{n} w_i x_i \geq T \qquad \text{Equation 1}$$

where E denotes the arithmetic sum. Thus a threshold function can be represented as $(W,T)=[w_1, w_2, \ldots, w_n; T]$. An example of a simple threshold function is $f$ (a, b, c, d)=abc$\vee$abd with $[w_1, w_2, w_3, w_4; T]=[2, 2, 1, 1; 5]$. A more complex threshold function is g(a, b, c, d, e)=ab$\vee$acd$\vee$bcd$\vee$ace$\vee$bce$\vee$ade$\vee$bde with $[w_1, w_2, w_3, w_4, w_5; T]=[2, 2, 1, 1, 1; 4]$. Although threshold functions can be implemented as static CMOS logic circuits, implementations that are based on evaluating the defining predicate in Equation 1 by comparing some physical quantity such as charge or conductance can result in substantial reductions in gate count, area and power, as well as improving the performance when compared to standard logic implementations.

A. Operation of a TLC

Figure 4:
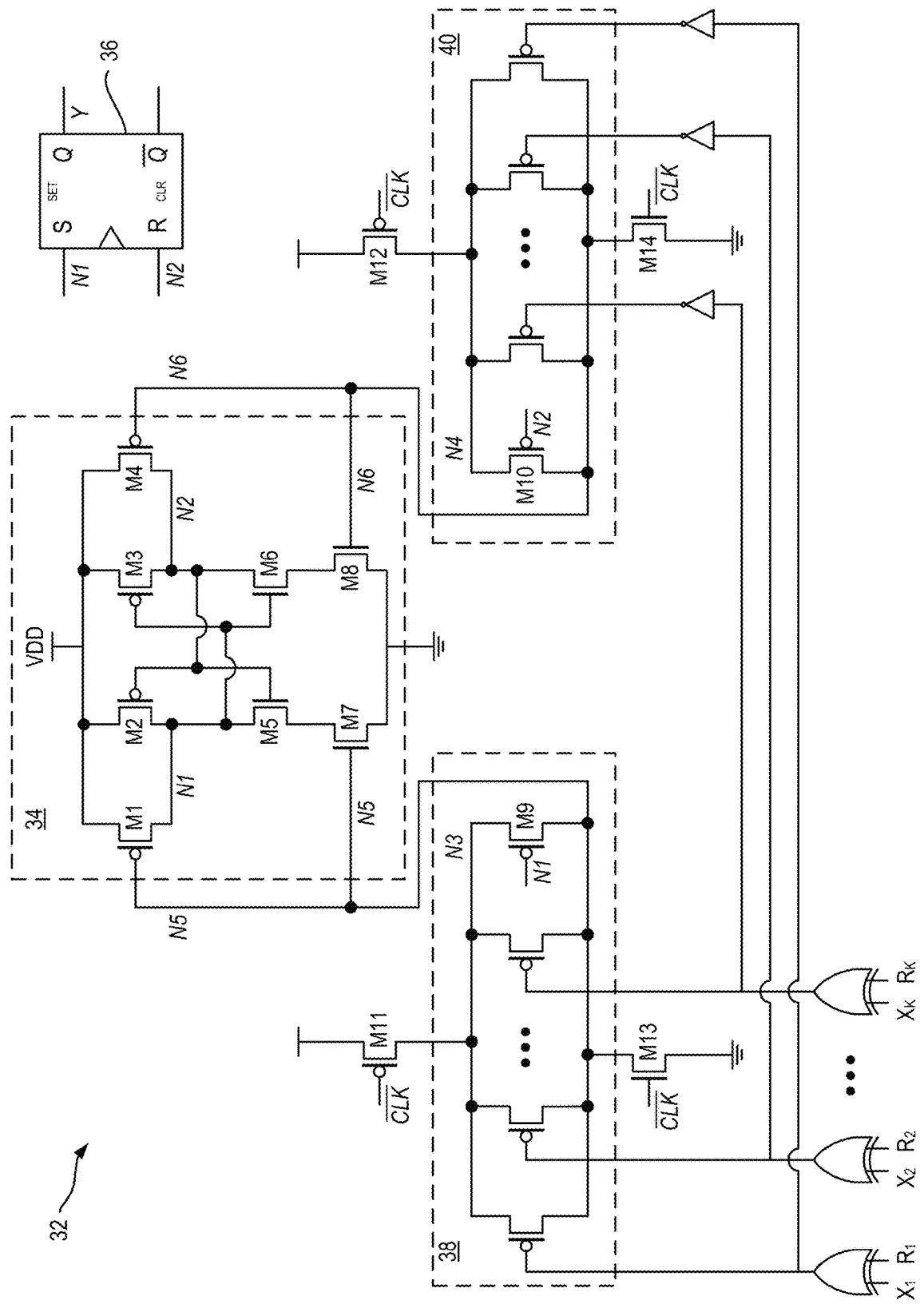
FIG. 4 is a schematic diagram of a transistor-level structure of an embodiment of a threshold logic cell (TLC) of FIGS. 3A and 3B.

FIG. 4 is a schematic diagram of a transistor-level structure of an embodiment of the TLC 32 of FIGS. 3A and 3B. The TLC 32 includes a sense amplifier 34, a latch 36, a left input network 38, and a right input network 40. The TLC 32 circuit operates in two phases. In the reset phase (CLK=0), N5 and N6 are discharged, turning off all discharge paths from N1 and N2 to ground. The outputs N1 and N2 transition to logic high (e.g., 1) through M1 and M4.

Evaluation takes place when CLK:0→1, assuming that the inputs have arrived, and that the left input network 38 has higher conductivity than the right input network 40. In the evaluation phase, M13 and M14 are turned OFF, and both N5 and N6 will rise to logic high. Without the loss of generality, assume as a result, node N5 rises before node N6, and turns M7 on. Prior to evaluation, N1 and N2 were both logic high. Hence, M5 is active when M7 turns on. This discharges N1 through M5 and M7. The discharge of N1 stops the further discharge of N2 by turning off M6 and turning on M3. Consequently, the final values of the outputs are N1=0, N2=1, which resets the output latch 36.

If the right input network 40 had high conductivity, the result would have been N1=1, N2=0, which results in setting the latch 36. Note the feedback involving M9 and M10. These are strictly unnecessary but are included to ensure that once the clock transition completes, further changes on the inputs will not affect the outputs.

The signals applied to the left input network 38 and right input network 40 are complementary, to ensure that there will always be a difference of at least one active transistor between the two networks. A configuration register $R_i=0$ if input $X_i$ is to appear in positive polarity, and $R_i=1$ if $X_i$ is to be complemented. The use of complementary signals in the two input networks ensures a strict inequality between the conductivity of the left input network 38 and the right input network 40 and prevents the sense amplifier 34 from being in a metastable condition.

For the TLC 32 to properly realize a threshold function, the predicate shown in Equation 1 has to be converted to a strict inequality, and the variables in Equation 1 have to be mapped to its inputs. Thus, Equation 1 is replaced with $\Sigma_{i=1}^n 2w_ix_i > 2T-1$. As the signals driving the input networks 38, 40 are complementary, to realize this inequality the same number of literals representing a signal must appear in both networks. For example, consider $f(a, b, c)=a\vee bc \equiv 2a+b+c \geq 2 \equiv 4a+2b+2c > 3$. This is rewritten as $2a+b+c+1 > 2(1-a)+(1-b)+(1-c)$. Therefore the signals assigned to left input network 38 in FIG. 2 would be $X_1=a$, $X_2=a$, $X_3=b$, $X_4=c$, $X_5=1$, $X_6=0$, and $X_7=0$, and $R_i=1$ for i=1, 2, ..., 7.

Note that this particular signal assignment only requires the seven XORs and configuration registers 14 to program the TLCs 32 and does not require any additional control mechanism. Furthermore, signal replication does not affect the track count in the TLFPGA 22. The configuration registers of a TLC 32 can be programmed alongside the configuration registers 14 of the LUT-Ks 18 in the TLFPGA 22.

B. TLC vs LUT

Table I shows a comparison of a TLC-7 with LUTs of various sizes. Both cells were implemented in 28 nm FDSOI with power and delay estimates obtained from parasitic extracted netlists. At the individual cell level, a TLC 32 has a substantially improved delay and power when compared to all standard size LUTs. In addition, the number of configuration registers and MUXs is also substantially reduced. For example, compared to an LUT-4, the TLC-7 is 2× faster and uses 31% less power.

TABLE I

| BLE Type | Config. Regs | MUX/XOR | Delay (ps) | Power (μW) |
| --- | --- | --- | --- | --- |
| LUT-4 | 16 | 15 | 220 | 33.2 |
| LUT-5 | 32 | 31 | 226 | 64.0 |
| LUT-6 | 64 | 63 | 294 | 125.0 |
| LUT-7 | 128 | 127 | 331 | 248.0 |
| TLC | 7 | 7 | 109 | 22.8 |

Figure 5:
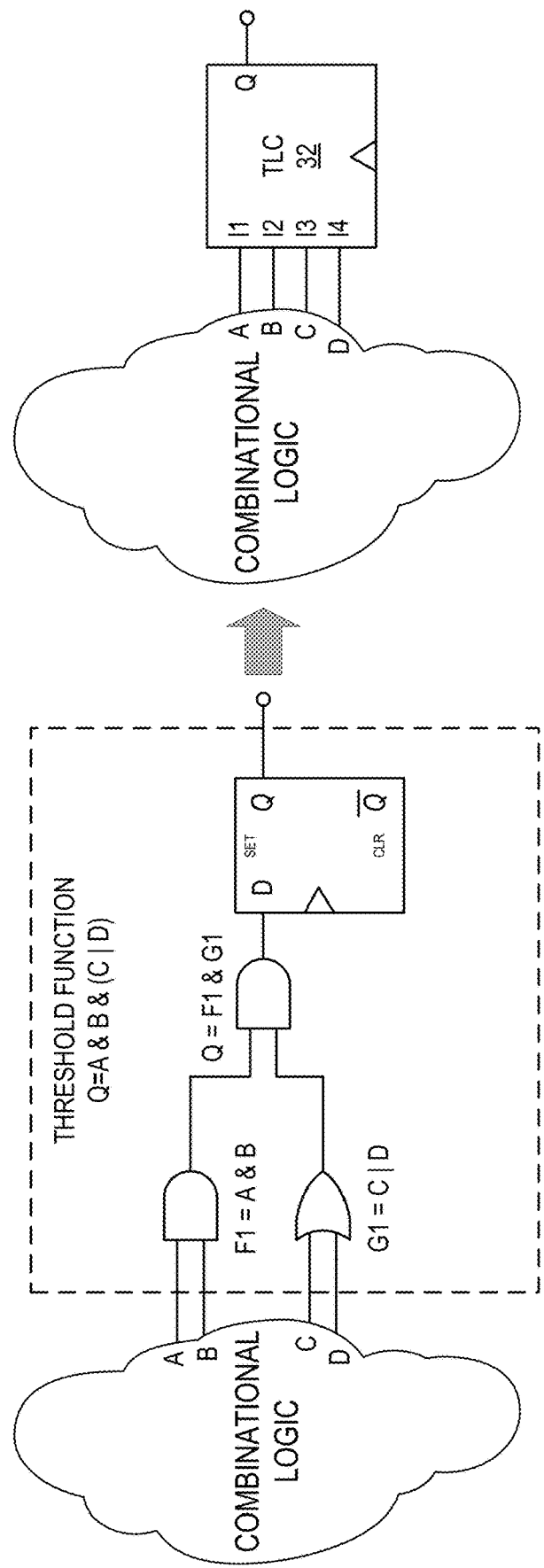
FIG. 5 is a schematic diagram illustrating logic absorption by a threshold function.

FIG. 5 is a schematic diagram illustrating logic absorption by a threshold function. A TLC 32 can only realize a limited set of functions. This limitation can be overcome by proper logic absorption, such as illustrated in FIG. 5. When a part of a logic cone feeding a flip-flop happens to be a threshold function that can be realized by a TLC 32 (e.g., a TLC-7), that part along with the flip-flop can be replaced by a single TLC 32. Threshold functions occur frequently in many practical circuits. Thus, a key step in mapping circuits to the TLFPGA 22 is to identify threshold functions that are part of the logic cone feeding flip-flops.

C. TLC Tile vs LUT Tile

Figure 6:
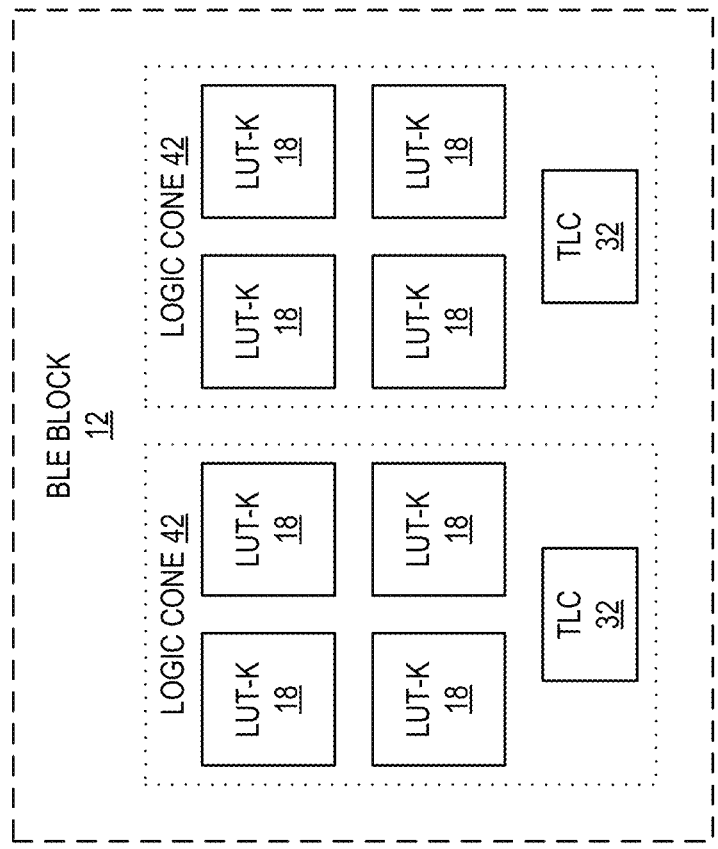
FIG. 6 illustrates typical logic cones implemented in a basic logic element (BLE) block of the TLFPGA logic tile of FIG. 3B.

FIG. 6 illustrates typical logic cones 42 implemented in the BLE block 12 of the TLFPGA logic tile 24 of FIG. 3B. A cluster of eight LUT-Ks 18 and two TLCs 32 was chosen for the BLE block 12 of the TLFPGA logic tile 24 because most of the logic cones 42 in the benchmark circuits evaluated herein had threshold functions with a support set of four variables. This means each feeder circuit output could be mapped to an LUT (e.g., as illustrated in FIG. 5). Hence, clustering four LUT-Ks 18 with a single TLC 32 would allow the routing between the LUT-Ks 18 and the inputs of the TLC 32 to remain within a single tile, thereby reducing the inter-tile routing. This leads to an improvement in the overall performance of the circuit. Since a BLE block 12 size of five is too small, a size of ten BLEs was chosen. It should be understood that some embodiments use other quantities of BLEs in the BLE block 12. In addition, with the LUT-Ks 18 and TLCs 32, a TLFPGA implementing the TLFPGA logic tile 24 can perform or realize any arbitrary computer-implementable Boolean logic function, rather than Boolean threshold functions alone. The arbitrary Boolean logic functions realizable by the TLFPGA are thus limited only by available on-chip resources (e.g., number of inputs of the LUT-Ks 18 and/or TLCs 32, the number of TLFPGA logic tiles 24 which can be arrayed together, etc.).

TLFPGA logic tiles 24 with 4, 5, 6, and 7-input LUTs were designed to examine the effect of LUT size on area, power, and performance. Note that a TLFPGA logic tile 24 contains fewer configuration registers 14 and fewer BLE MUXs (e.g., intra-tile interconnect resources 20) as compared to a logic tile with only LUT-Ks 18, and is therefore significantly smaller than a standard FPGA logic tile 10. The area comparison between the FPGA logic tile 10 and the TLFPGA logic tile 24 is shown in Table II. At the individual cell level and at the tile level, the TLFPGA 22 shows substantial improvement in area. Later in Section VI, it is shown that the use of the TLFPGA architecture improves the overall PPA by reducing both the logic and routing resources during technology mapping.

TABLE II

| K | LUT-K FPGA ($\mu m^2$) | LUT-K TLFPGA ($\mu m^2$) | Improvement (%) |
|---|---|---|---|
| 4 | 192 | 176 | 8.3% |
| 5 | 272 | 236 | 13.2% |
| 6 | 428 | 353 | 17.5% |
| 7 | 780 | 617 | 20.9% |

III. Top Flow for TLFPGA

Figure 7:
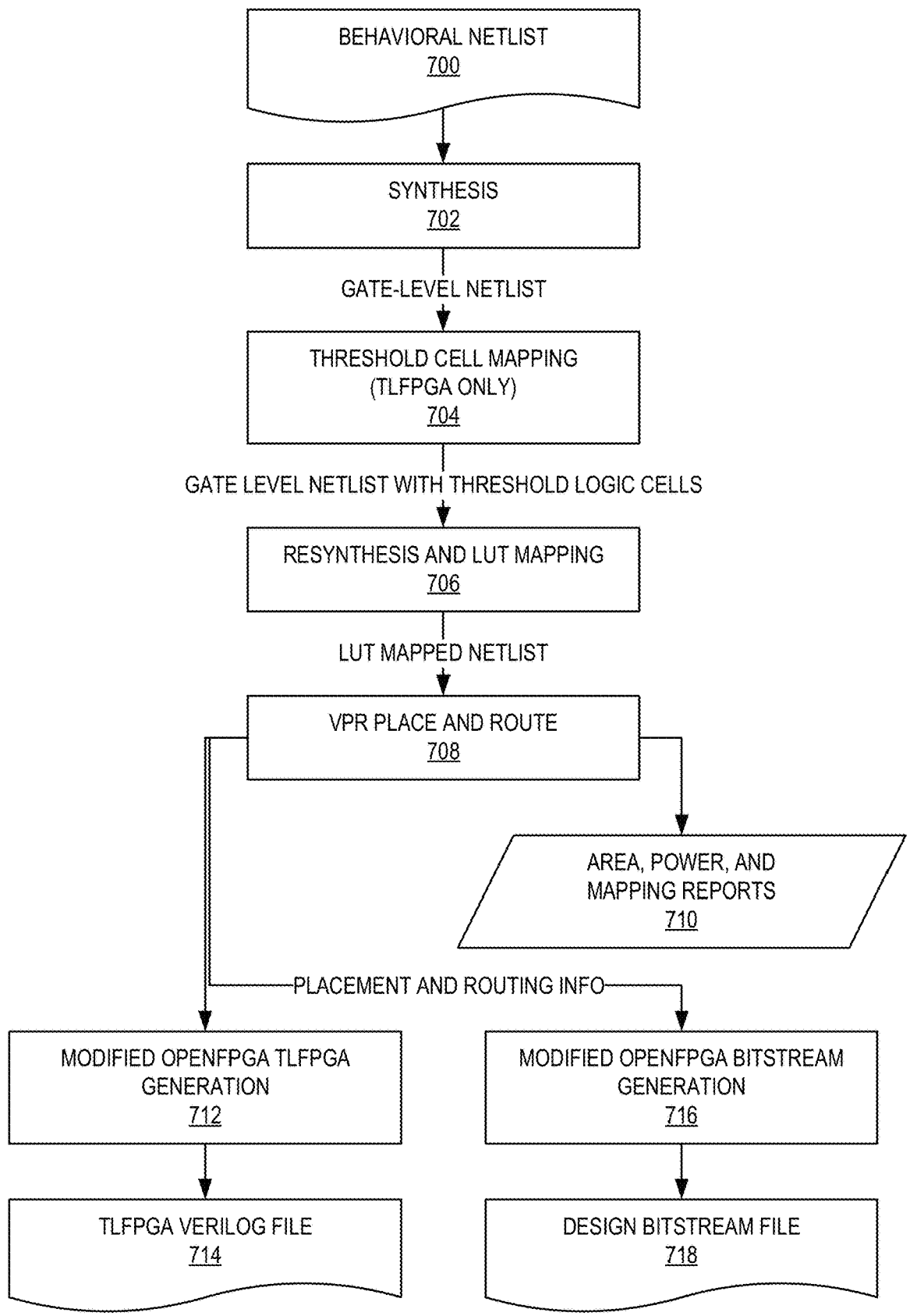
FIG. 7 illustrates a modified OpenFPGA design flow for generating a bit-stream file for the TLFPGA of FIG. 2.

FIG. 7 illustrates a modified OpenFPGA design flow for generating a bit-stream file for the TLFPGA 22 of FIG. 2. The main modifications made to the OpenFPGA design flow for designing with a TLFPGA 22 are addition of threshold cell mapping (TCM) algorithm and post-TCM improvements, which are explained in the following two sections.

The OpenFPGA's bit-stream generator was updated to support programming for TLCs. The FPGA generator was also modified to generate the Verilog output for a TLFPGA. The input to this flow is a given behavioral description (e.g., behavioral netlist) of a circuit (block 700). This netlist is synthesized to generate a gate-level netlist (block 702). The TCM is then performed on the flattened gate-level netlist (block 704, further described in Section IV) followed by LUT mapping using ABC (described in R. Brayton and A. Mishchenko, "ABC: An Academic Industrial-strength Verification Tool," in IEEE CAV, Springer-Verlag, 2010) (block 706). The TCM is TLFPGA-specific and is not included in a conventional FPGA Flow.

The resulting circuit is passed to a Versatile Packing, Placement and Routing (VPR) tool (described in V. Betz and J. Rose, "VPR: A New Packing, Placement and Routing Tool for FPGA Research," in IEEE FPL, Springer-Verlag, 1997) for placement and routing (block 708). Area, power, and mapping reports can be produced from the VPR tool (block 710). The routing and placement information generated by VPR is used by the modified OpenFPGA to generate (block 712) the final TLFPGA Verilog (block 714). OpenFPGA also uses this information to generate (block 716) a bit-stream configuration file (block 718), required to program the TLFPGA.

IV. Threshold Cell Mapping

This section describes the algorithm required to map a circuit to the TLFPGA architecture. The algorithm takes a synthesized netlist and replaces selected parts of the circuit with TLCs to create a netlist with a combination of TLCs and logic cells. In the following, a brief outline of the TCM algorithm is presented.

The key step in TCM, referred to as TLextract, is to identify a subcircuit whose function is a threshold within a logic cone driving a given flip-flop. A simple heuristic is employed to perform TLextract.

First, the set of all threshold functions that can be realized by a TLC-7 are enumerated based on the restrictions placed by the signal assignment method described in Section II.

There are twenty-two such functions with a support set of at most five. This allows the logic cone starting from the input of the flip-flop to be searched for the cut size of at most five, extracted and then tested whether the function of the circuit is a threshold function among those that can be realized by a TLC-7. Because the size is limited and the search is limited to unate subcircuits, exact testing by verifying the definition in Equation 1 is feasible and fast. Note that the TLextract is guaranteed to return a valid result. The trivial case would be a single logic gate that drives the input of the flip-flop.

Whether or not the threshold subcircuit is replaced by a TLC-7 is determined by a trial-mapping. For a given flip-flop, this procedure creates two copies of the subcircuit containing the flip-flop and its input logic cone. In the first copy, trial-mapping replaces the flip-flop, and the cone that was returned by TLextract with a TLC-7. The part of the circuit which was not replaced with a TLC-7 is mapped to the LUTs. In the second copy, all the cells from the original netlist are mapped to the LUTs. These two alternatives are compared based on logic depth and LUT count.

TLextract can be performed independently on flip-flops whose logic cones do not intersect. Two flip-flops whose logic cones intersect are said to be dependent. This is viewed as a transitive relation, and therefore is an equivalence relation. Hence the flip-flops are easily partitioned into groups, each group consisting of dependent flip-flops and distinct groups being independent. Within a group, TLextract is performed iteratively, in the descending order of their timing criticality.

Given a TLFPGA architecture with a limited number of LUTs, TLCs, and routing resources, the mapping algorithm performs the trial mapping against the following constraints to enhance the resource utilization of the TLFPGA:

Architecture based mapping constraint: The synthesis algorithm tries to maintain the ratio 4 LUTs to 1 TLC during TCM using this constraint. This constraint is applied to maximize the BLE utilization in the mapped tiles. Given a circuit with a requirement of N LUTs, if the TLC-7 can be mapped to S flip-flops and if S>N/4, then this constraint allows only the top N/4 timing critical flip-flops to be mapped to TLC-7(s) in the final circuit. By matching the TLC/LUT ratio of the tile with the circuit's ratio, the tiles can be packed with a higher density such that there are no unused BLEs in the mapped tiles.

Area and power reduction constraint: Reduction in the number of mapped LUTs reduces the required logic area and power. If the number of mapped LUT-K(s) drop by X, when Y number of TLC(s) are mapped the change in the number of configuration registers is given using the following equation:

$$Config_{Reg_{New}} = Config_{Reg_{old}} - X*(2^K) + Y*7$$

FIG. 8A illustrates a circuit implementation cost in a traditional TLFPGA. FIG. 8B illustrates a circuit implementation cost in the TLFPGA 22 of FIG. 2. In the example shown in FIGS. 8A and 8B, the original LUT mapping requires $3*(2^K)$ configuration registers, but after TCM, this requirement drops to $2*(2^K)+7$. This constraint allows the TCM to map the TLC-7 to a flip-flop only if the mapping leads to a reduction in the number of LUTs.

Performance constraint: To ensure that the performance is not degraded after the TCM, the performance constraint allows flip-flops and their input logic cones to be replaced with TLCs only if it does not increase the logic depth.

Cell fanout constraint: Any cell in the given circuit with an output net having a fanout of 2 or more needs to be mapped to the output of an LUT/TLC. Logic-replication helps remove this mapping requirement by dropping the cell's effective fanout to 1. However, logic-replication, when performed in excess can significantly increase the LUT count. Therefore, the cell fanout constraint allows the logic replication only for cells with a fanout of 2.

Complex cell constraint: A complex cell (e.g., half-adder) can be decomposed into simpler threshold functions, but the decomposed structure might contain cells which have a fanout of 2 or more. To avoid generating unnecessary fanouts during TCM, the complex cell constraint blocks the decomposition of complex cells during TCM, so that they can be directly mapped to the LUTs.

V. Post-TCM Improvements

This section discusses how the results from TCM are improved after the initial set of mapping and placement information is collected.

Once VPR performs an initial placement of the design, a timing-based simulated annealing algorithm is used to rearrange the TLCs in the TLFPGA. TLCs on the timing-critical paths are given a higher priority for favorable placement locations on the TLFPGA.

Most heterogeneous FPGA architectures face a congestion problem. Over-use of a particular type of BLE (e.g., LUT, TLC) leads to its scarcity. This makes it harder for the technology-mapper to find the necessary resources. This is an undesirable effect as it makes the design spread over a larger area. This problem is observed less in the TLFPGA due to two reasons. First, TLCs are small and require much less area overhead, in case the TLCs are not used. Second, the registers that the TLCs are mapped to are chosen based on the placement congestion. In a TLFPGA region with scarcity of TLCs, there is a choice to map the threshold function directly to an existing LUT resource. This feature helps the placer find enough TLCs during placement without compromising on the placement locations. This is an extremely important feature as it significantly reduces the negative impacts of having a heterogeneous architecture. In typical heterogeneous FPGAs, under/over-use of a particular type of BLE leads to PPA penalties. For the TLFPGA, since the input count of an LUT and a TLC is similar, the mapping can be performed in a way such that the LUTs and the TLCs can be used interchangeably, without affecting the PPA much.

VI. Evaluation Results

This section compares the design metrics of the TLFPGA with conventional FPGA architectures using VPR as well as the layout extracted netlists.

A. Benchmark Setup

The TLFPGA architecture was evaluated using ISCAS-85 and Open-Cores benchmark circuits using the ST Microelectronics 28 nm FDSOI Technology at Slow/Slow 0.9 V VDD 125° C. simulation corner. In order to map the circuits to the TLCs, the benchmark circuits need to be sequential.

For studying the effects of uniform pipelining on the TLFPGA, registers were added to the ISCAS-85 circuits using retiming. Ranging from a single pipeline stage to nine pipeline stages, the ten combinational ISCAS-85 circuits were modified to generate a total of 90 sequential circuits. For the Open-Cores circuits, the number of pipeline stages was increased with the help of re-timing, until the logic depth of the critical paths reached a value between 8 and 12.

B. VPR Results for ISCAS-85 Circuits

The results extracted using VPR contain fully placed and routed circuits, based on the model parasitics of the FPGA and the TLFPGA. Models used for VPR are based on the tile structures placed and routed using Cadence Innovus®.

Figure 1B:
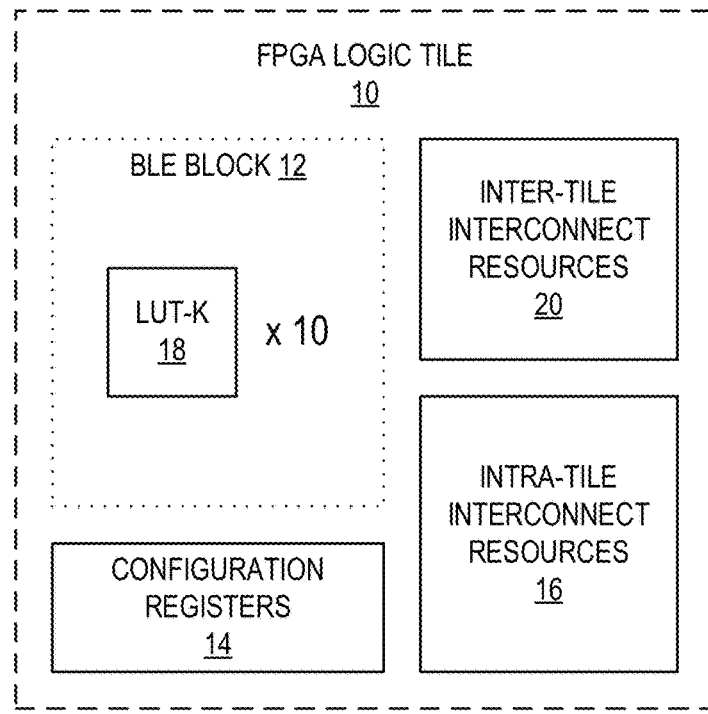
FIG. 1B is a schematic diagram of an alternative FPGA logic tile for a traditional FPGA.
Figure 9C:
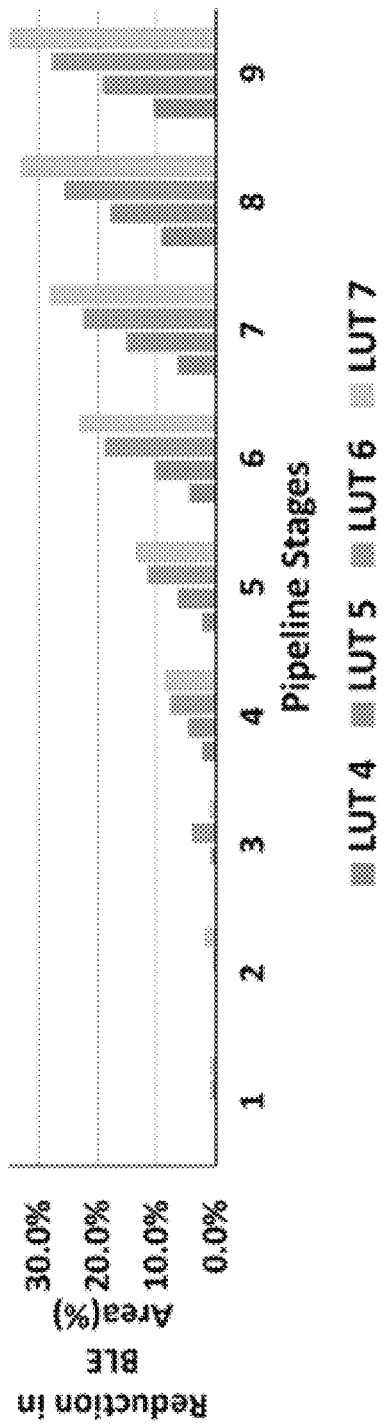
FIG. 9C is a graphical representation of an average percentage reduction in area in the TLFPGA of FIG. 9A.
Figure 9D:
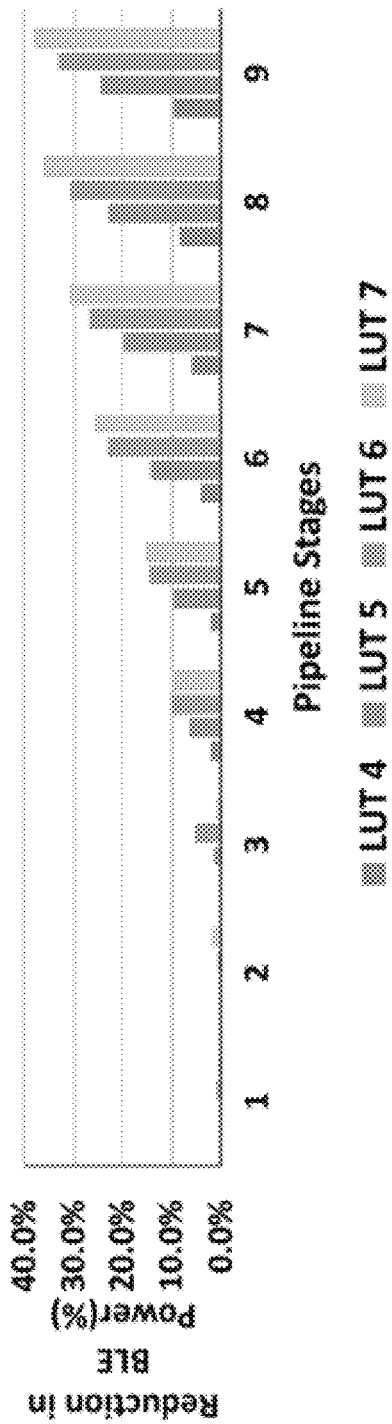
FIG. 9D is a graphical representation of an average percentage reduction in power in the TLFPGA of FIG. 9A.

FIG. 9A is a graphical representation of an average percentage reduction in BLE configuration registers in a TLFPGA according to FIG. 3B as compared to a traditional FPGA according to FIG. 1B for varying LUT sizes and pipeline stages. FIG. 9B is a graphical representation of an average percentage reduction in MUXs in the TLFPGA of FIG. 9A. FIG. 9C is a graphical representation of an average percentage reduction in area in the TLFPGA of FIG. 9A. FIG. 9D is a graphical representation of an average percentage reduction in power in the TLFPGA of FIG. 9A.

The TLFPGA and FPGA of FIGS. 9A-9D were evaluated over the ISCAS-85 circuits. Improvements in technology-independent parameters, such as configuration registers and MUXs (FIGS. 9A and 9B) indicate that the TLFPGA can potentially offer benefits at other technology nodes as well. As the number of pipeline stages increases, improvements in area and power of the BLEs used in the TLFPGA increase when compared to an FPGA. Increasing the number of stages increases the number of flip-flops, providing a greater opportunity for replacement with TLCs and logic absorption, and leading to greater improvements. These evaluations clearly indicate that the TLFPGA gets the best results when used for deeply pipelined circuits.

FIGS. 9A-9D also show that for a fixed number of pipeline stages, the advantages in the BLE parameters in a TLFPGA increase with larger sizes of LUTs as compared to an FPGA. This is because there is an exponential rise in the number of configuration registers and MUXs as the LUT size increases, whereas the number of configuration registers and XORs in a TLC are unchanged. Hence, reducing the larger LUTs during technology mapping drastically drops the area and power requirements, resulting in significantly higher improvements when the TLFPGA is used.

Figure 10A:
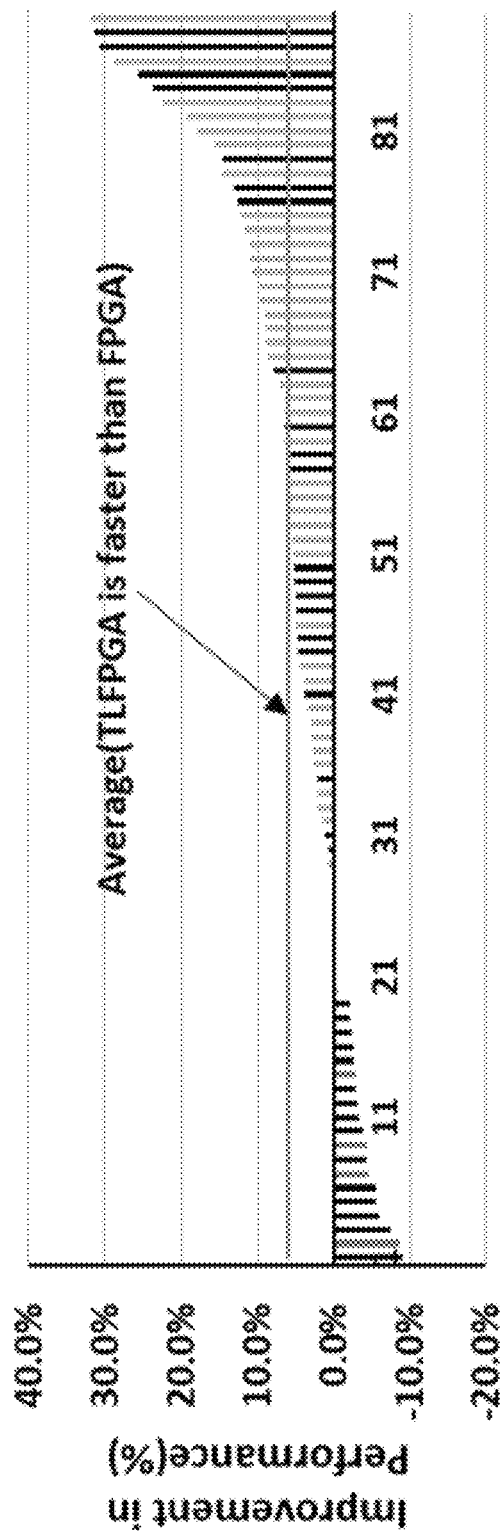
FIG. 10A is a graphical representation of improvements in performance for a six-input LUT (LUT-6) TLFPGA according to FIG. 3B over an LUT-6 FPGA according to FIG. 1B.
Figure 10B:
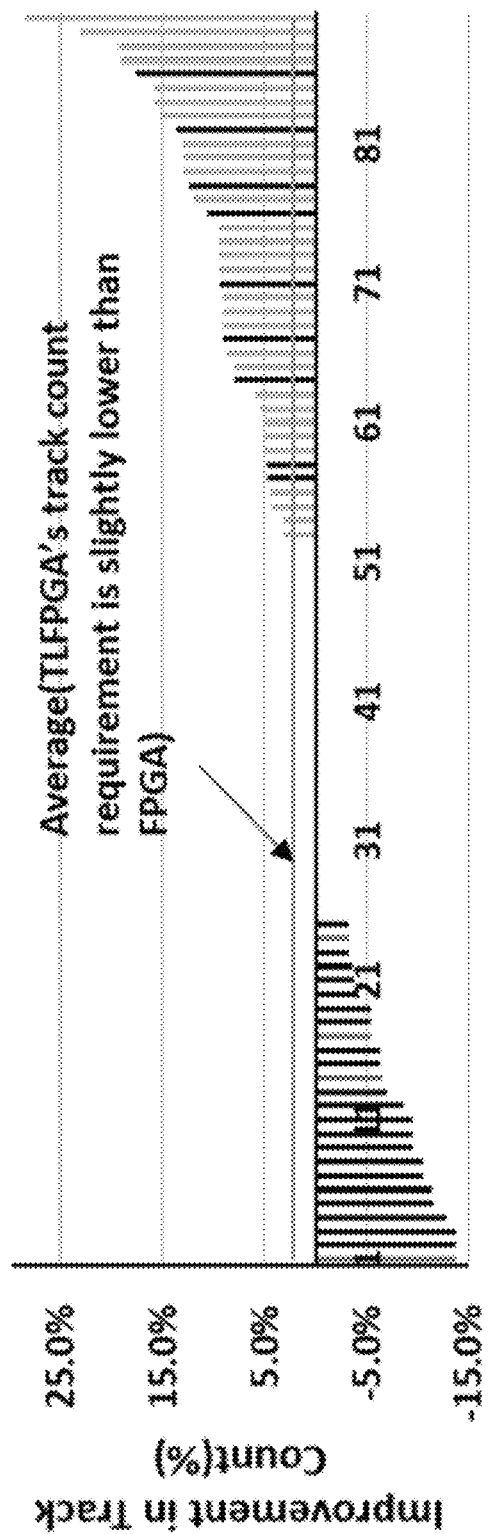
FIG. 10B is a graphical representation of improvements in track count for the TLFPGA of FIG. 10A.

FIG. 10A is a graphical representation of improvements in performance for an LUT-6 TLFPGA according to FIG. 3B over an LUT-6 FPGA according to FIG. 1B. FIG. 10B is a graphical representation of improvements in track count for the TLFPGA of FIG. 10A. Simultaneous improvement in performance and track count over the benchmark circuits is shown in these figures. While 54% of the circuits demonstrated an improvement in both the performance and the track count, only 4% of the circuits had a degradation in both of these parameters. 41% of the circuits traded off one parameter for the other.

Figure 11A:
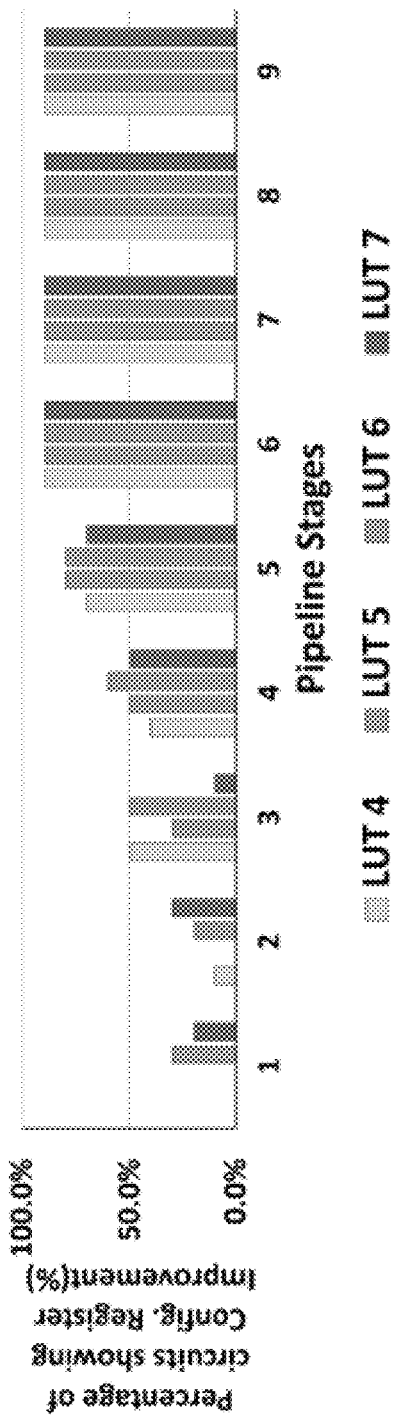
FIG. 11A is a graphical representation of a fraction of circuits that showed improvements in the number of BLE configuration registers in a TLFPGA according to FIG. 3B as compared to a traditional FPGA according to FIG. 1B for varying LUT sizes and pipeline stages.
Figure 11B:
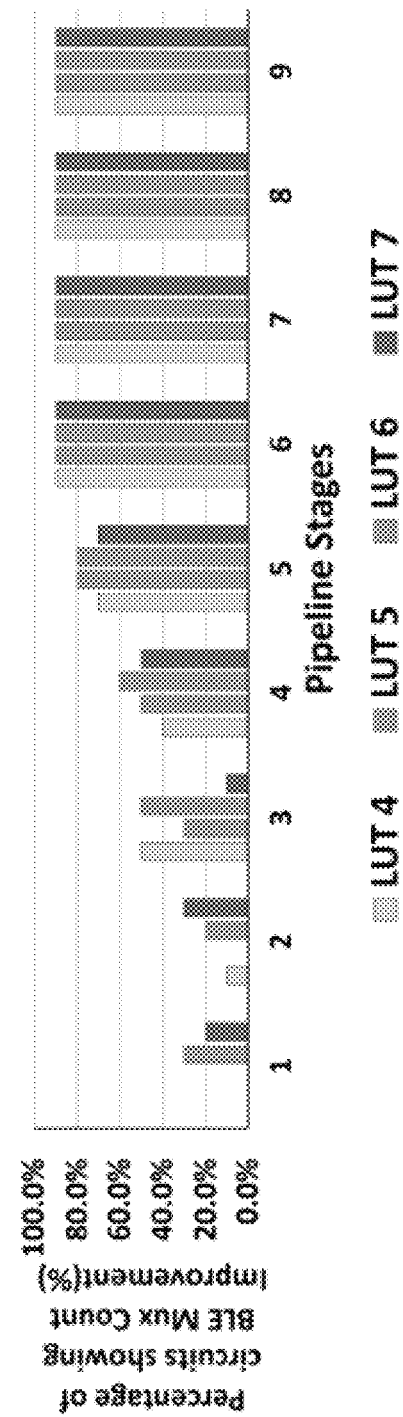
FIG. 11B is a graphical representation of the fraction of circuits that showed improvements in the number of MUXs for the TLFPGA of FIG. 11A.
Figure 11C:
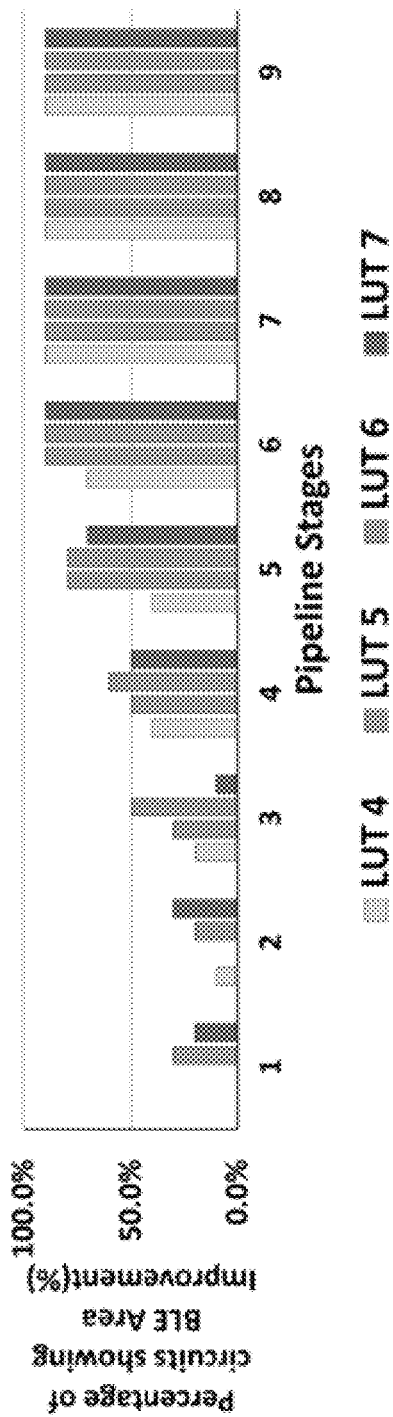
FIG. 11C is a graphical representation of the fraction of circuits that showed improvements in area for the TLFPGA of FIG. 11A.
Figure 11D:
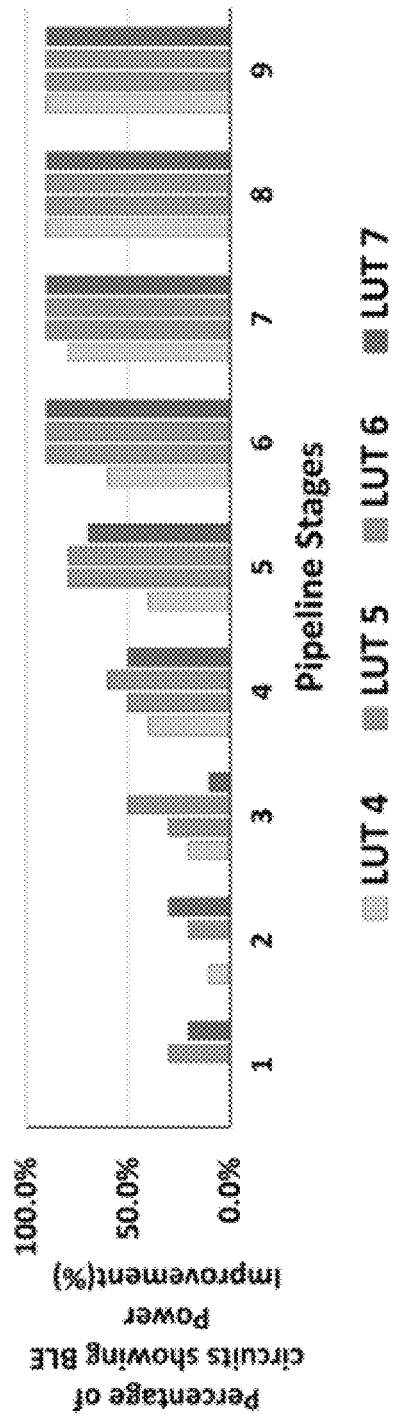
FIG. 11D is a graphical representation of the fraction of circuits that showed improvements in power for the TLFPGA of FIG. 11A.

FIG. 11A is a graphical representation of a fraction of circuits that showed improvements in the number of BLE configuration registers in a TLFPGA according to FIG. 3B as compared to a traditional FPGA according to FIG. 1B for varying LUT sizes and pipeline stages. FIG. 11B is a graphical representation of the fraction of circuits that showed improvements in the number of MUXs for the TLFPGA of FIG. 11A. FIG. 11C is a graphical representation of the fraction of circuits that showed improvements in area for the TLFPGA of FIG. 11A. FIG. 11D is a graphical representation of the fraction of circuits that showed improvements in power for the TLFPGA of FIG. 11A.

As the number of pipeline stages increases, it can be seen that the number of circuits benefiting from the TLFPGA architecture increases as well. As the number of pipeline stages increases, the number of flip-flops in the design increases, which creates more opportunities to map the TLCs, eventually leading to better parameter improvements.

Figure 12A:
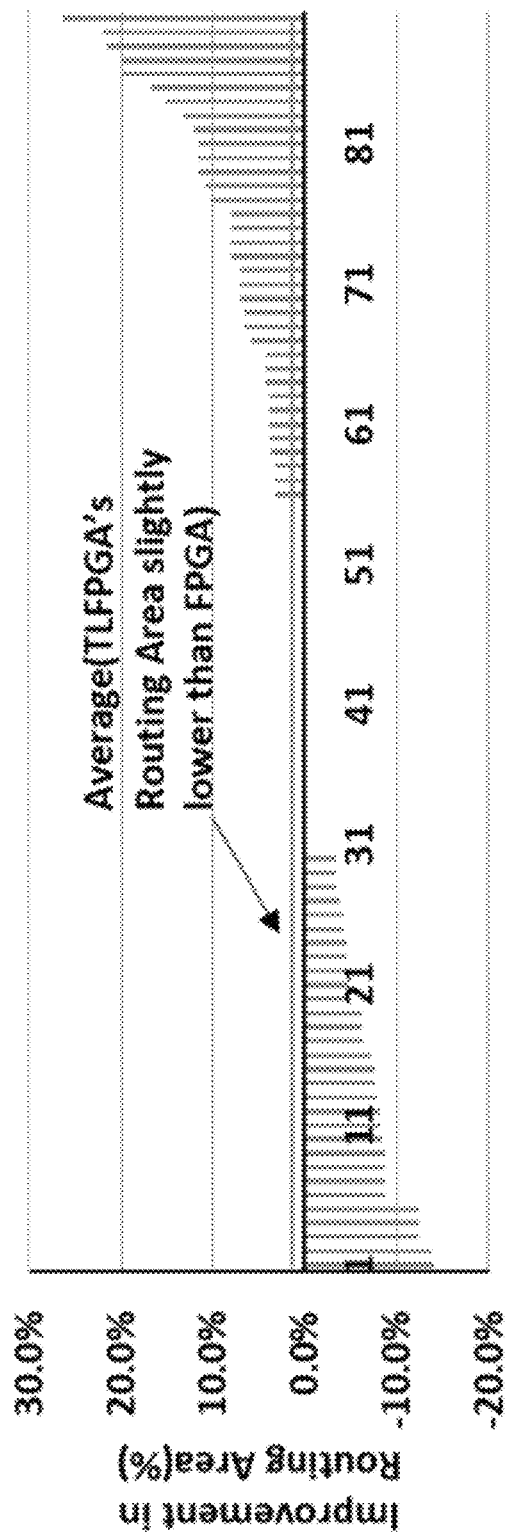
FIG. 12A is a graphical representation of improvements in routing area for an LUT-6 TLFPGA according to FIG. 3B over an LUT-6 FPGA according to FIG. 1B.
Figure 12B:
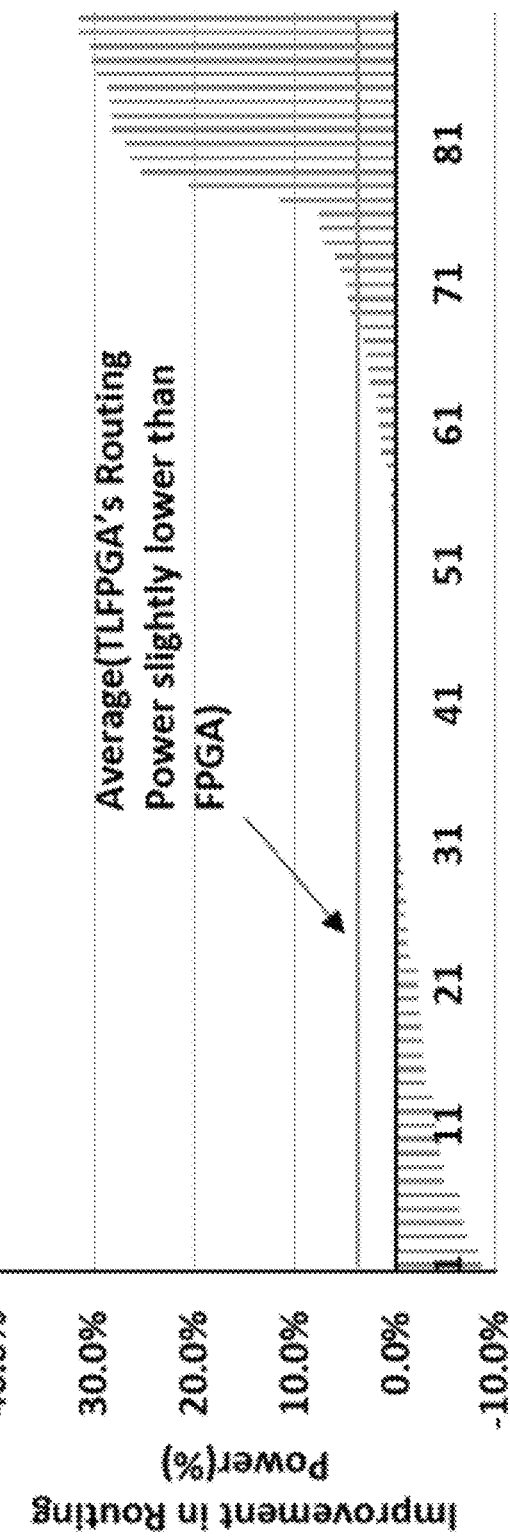
FIG. 12B is a graphical representation of improvements in power for the TLFPGA of FIG. 12A.

FIG. 12A is a graphical representation of improvements in routing area for an LUT-6 TLFPGA according to FIG. 3B over an LUT-6 FPGA according to FIG. 1B. FIG. 12B is a graphical representation of improvements in power for the TLFPGA of FIG. 12A. The routing area and power also slightly improve when TLFPGA is used. This is because a reduction in the total number of BLEs reduces the number of routing resources.

C. VPR Results for OpenCores Circuits

The ISCAS-85 circuits were chosen for the evaluations described above because it is easy to add uniform pipeline stages to these circuits. However, the ISCAS-85 circuits may not best represent the industrial designs presently available. Therefore, for further evaluation of the TLFPGA architecture, the benchmark circuits from OpenCores were used. These circuits were deeply-pipelined to boost the improvements gained from using the TLFPGA. The typical logic depth for these circuits is 8-12 logic gates. Table III shows the improvements in various parameters for the OpenCores circuits.

TABLE III

| Circuit | LUT | Regs. | MUX | Area | Power | Crit. Path | Freq | Track count |
|---|---|---|---|---|---|---|---|---|
| 64-bit Adder | 18.1% | 15.2% | 15.1% | 9.8% | 13.1% | 8.3% | 9.8% | 0.0% |
| 64-bit Comparator | 3.5% | 3.0% | 3.0% | 2.1% | 2.7% | 15.2% | 17.9% | 0.0% |
| 32-bit Multiplier | 44.9% | 40.1% | 40.0% | 31.5% | 36.7% | 22.9% | 29.7% | 0.0% |
| Hartley FFT | 12.1% | 10.9% | 10.9% | 8.7% | 10.0% | 7.8% | 8.5% | 0.0% |
| Mod-3 Calculator | 12.7% | 11.2% | 11.2% | 8.5% | 10.1% | 10.9% | 12.3% | 0.0% |
| 16-bit Divider | 20.6% | 18.3% | 18.2% | 14.0% | 16.6% | 4.4% | 4.6% | 0.0% |
| 32-bit Filter | 5.6% | 4.8% | 4.7% | 3.3% | 4.2% | 17.3% | 21.0% | 3.1% |

D. Results from Fully Extracted Layouts with Parasitics

The results in this subsection are generated using the parasitic-extracted netlists from Cadence Innovus®. With a fixed track count of 96 and a cluster size of 10, the physical layouts of an 8×8 FPGA and TLFPGA were generated. The synthesis and layout of the required blocks were done using Cadence Genus® and Innovus®.

Tables IV and V show the power and area comparison of a LUT-7 FPGA tile versus a LUT-7 TLFPGA tile. These tables report the area and power numbers of the full tile, which includes inter-tile and intra-tile routing resources as well. It can be seen that both the area and power of the TLFPGA tile are lower than the FPGA tile.

TABLE V

| Parameter | FPGA Tile | TLFPGA Tile | % Reduction |
|---|---|---|---|
| Area | 1054.6 µm² | 870.5 µm² | 17.5% |
| Internal power | 13.7 µW | 11.23 µW | 18.0% |
| Switching power | 8.8321 µW | 7.418 µW | 15.9% |
| Leakage power | 10.43 µW | 8.701 µW | 16.6% |
| Total power | 32.95 µW | 27.35 µW | 17.0% |

Tables VI and VII show the instance count and area comparison of a LUT-7 FPGA tile versus a LUT-7 TLFPGA tile. The area of the physical layout is dependent on both the cell type and the drive strengths of the cells. For evaluation purposes, the combinational loops that arise from the FPGA's and TLFPGA's routing paths are set to false paths and the place-and-route tool adds minimum drive-strength buffers against signal slew-rate constraints. Although this method is not ideal for a real FPGA design, it allows for ready generation and evaluation of the FPGA architectures using a fully automated flow.

TABLE VI

| | FPGA Count | Weight | TLFPGA Count | Weight | Drop |
|---|---|---|---|---|---|
| CLB | 51968 | 15.5% | 40576 | 12.5% | 21.9% |
| IO Config | 2688 | 0.8% | 2688 | 0.8% | 0.0% |
| Crossbar | 216896 | 64.5% | 216896 | 66.8% | 0.0% |
| Switchbox | 64507 | 19.2% | 64478 | 19.9% | 0.0% |
| Total | 336059 | 100.0% | 324638 | 100.0% | 3.4% |

TABLE IV

| | FPGA | | | | TLFPGA | | | | Drop % | | | |
| | Internal | Switching | Leak | Total | Internal | Switching | Leak | Total | Internal | Switching | Leak | Total |
|---|---|---|---|---|---|---|---|---|---|---|---|---|
| CLB | 1.72 | 5.47 | 0.75 | 7.94 | 1.32 | 4.73 | 0.62 | 6.67 | 23.4% | 13.4% | 17.9% | 16.0% |
| Switchbox | 1.12 | 3.56 | 0.50 | 5.19 | 1.08 | 3.44 | 0.50 | 5.02 | 3.9% | 3.5% | 0.1% | 3.3% |
| Crossbar | 5.00 | 2.79 | 2.38 | 10.17 | 4.99 | 2.68 | 2.38 | 10.06 | 0.1% | 3.9% | 0.0% | 1.1% |
| IO Config | 0.02 | 0.06 | 0.01 | 0.10 | 0.02 | 0.06 | 0.01 | 0.10 | 3.7% | −2.5% | −5.6% | −1.4% |
| Total | 7.87 | 11.88 | 3.65 | 23.41 | 7.42 | 10.92 | 3.52 | 21.85 | 5.7% | 8.1% | 3.7% | 6.6% |

TABLE VII

|  | FPGA Area (µm²) | Weight | TLFPGA Area (µm²) | Weight | Drop |
| --- | --- | --- | --- | --- | --- |
| CLB | 66658 | 17.2% | 53728 | 14.3% | 19.4% |
| IO Config | 9651 | 2.5% | 9651 | 2.6% | 0.0% |
| Crossbar | 253620 | 65.4% | 253620 | 67.6% | 0.0% |
| Switchbox | 57985 | 14.9% | 57966 | 15.5% | 0.0% |
| Total | 387916 | 100.0% | 374966 | 100.0% | 3.3% |

Due to the lack of accurate timing constraints on the inter-tile timing in the OpenFPGA flow, the size of the TLFPGA is limited to 8×8, to avoid major timing violations. The area of the FPGA and TLFPGA are almost the same at the end of the place-and-route flow, due to the lack of timing constraints for the global routing blocks, which makes it harder for the tools to set the drive strength of all the gates. Based on the static power analysis, a power drop is observed in the TLFPGA as compared to the FPGA. This is because the components in the tiles used in a TLFPGA consume lower power, as compared to the components of a standard FPGA. Additional power drops come from the TCM algorithm described in Section IV.

These results are not meant to show the final area and power results, but instead to show the potential improvements that we can gain from using the TLFPGA architecture in a real environment. Depending on the implementation, the overall benefits are subject to change. For example, if the routing architecture is implemented differently, then the overall PPA improvements will change.

Post-PnR Verilog of a small 8×8 FPGA and TLFPGA is used to map a few small circuits and compare the differences in the various parameters discussed above. Using a 300 MHz clock frequency, each test circuit shows an improvement in overall dynamic power.

VII. Computer System

Figure 13:
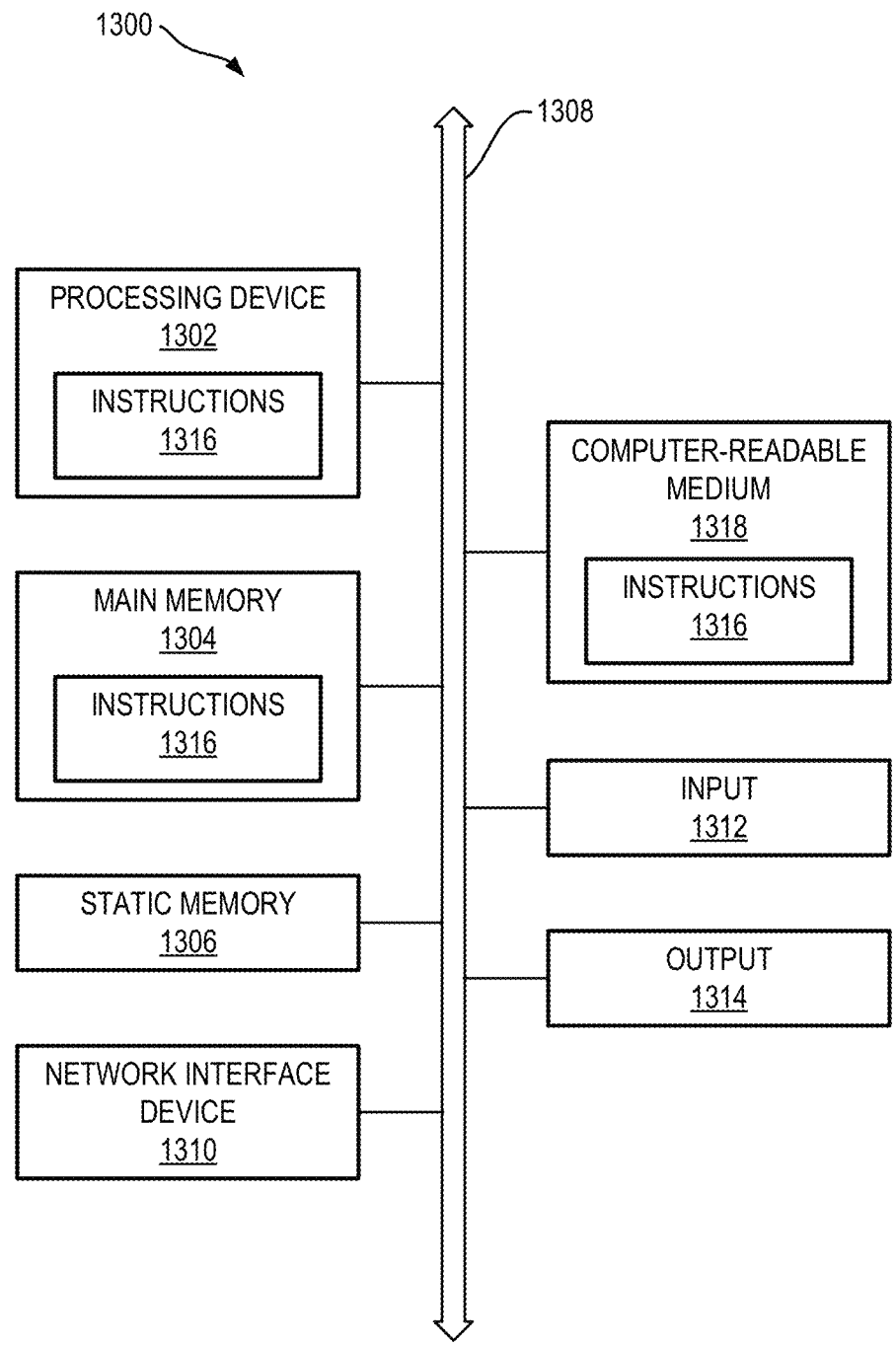
FIG. 13 is a schematic diagram of a generalized representation of an exemplary computer system.

FIG. 13 is a schematic diagram of a generalized representation of an exemplary computer system 1300 that could include the TLFPGA 22 of FIG. 2 and/or could be used to perform any of the methods or functions described above, such as designing or programming the TLFPGA 22. In this regard, the computer system 1300 may be a circuit or circuits included in an electronic board card, such as, a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1300 in this embodiment includes a processing device 1302 (e.g., the TLFPGA of FIG. 2) or processor, a main memory 1304 (e.g., read-only memory (ROM), flash memory, dynamic random access memory (DRAM), such as synchronous DRAM (SDRAM), etc.), and a static memory 1306 (e.g., flash memory, SRAM, etc.), which may communicate with each other via a data bus 1308. Alternatively, the processing device 1302 may be connected to the main memory 1304 and/or static memory 1306 directly or via some other connectivity means. In an exemplary aspect, the processing device 1302 may be the TLFPGA 22 of FIG. 2 and/or could be used to perform any of the methods or functions described above, such as designing or programming the TLFPGA 22.

The processing device 1302 represents one or more general-purpose processing devices, such as a microprocessor, central processing unit (CPU), or the like. More particularly, the processing device 1302 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1302 is configured to execute processing logic in instructions for performing the operations and steps discussed herein.

The various illustrative logical blocks, modules, and circuits described in connection with the embodiments disclosed herein may be implemented or performed with the processing device 1302, which may be an FPGA, a digital signal processor (DSP), an ASIC, or other programmable logic device, a discrete gate or transistor logic, discrete hardware components, or any combination thereof designed to perform the functions described herein. Furthermore, the processing device 1302 may be a microprocessor, or may be any conventional processor, controller, microcontroller, or state machine. The processing device 1302 may also be implemented as a combination of computing devices (e.g., a combination of a DSP and a microprocessor, a plurality of microprocessors, one or more microprocessors in conjunction with a DSP core, or any other such configuration).

The computer system 1300 may further include a network interface device 1310. The computer system 1300 also may or may not include an input 1312, configured to receive input and selections to be communicated to the computer system 1300 when executing instructions. The computer system 1300 also may or may not include an output 1314, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1300 may or may not include a data storage device that includes instructions 1316 stored in a computer-readable medium 1318. The instructions 1316 may also reside, completely or at least partially, within the main memory 1304 and/or within the processing device 1302 during execution thereof by the computer system 1300, the main memory 1304, and the processing device 1302 also constituting computer-readable medium. The instructions 1316 may further be transmitted or received via the network interface device 1310.

While the computer-readable medium 1318 is shown in an exemplary embodiment to be a single medium, the term "computer-readable medium" should be taken to include a single medium or multiple media (e.g., a centralized or distributed database, and/or associated caches and servers) that store the one or more sets of instructions 1316. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A threshold logic field-programmable gate array (TLFPGA), comprising:
a plurality of logic tiles, each logic tile comprising:
a lookup table (LUT);
a threshold logic cell (TLC) comprising a first set of inputs; and
field-programmable configuration registers adapted to store a logical configuration for the LUT and the TLC to realize a Boolean threshold function, wherein a set of the field-programmable configuration registers is coupled to the first set of inputs of the TLC to realize weights of the Boolean threshold function.

2. The TLFPGA of claim 1, wherein the TLC further comprises:
a second set of inputs to evaluate according to the Boolean threshold function; and
a sense amplifier configured to evaluate the Boolean threshold function based on the weights and the second set of inputs.

3. The TLFPGA of claim 2, wherein the second set of inputs are configured to be selectively coupled to outputs of the LUT.

4. The TLFPGA of claim 1, wherein the TLC operates as a multi-input edge-triggered flip-flop outputting the Boolean threshold function on a clock edge.

5. The TLFPGA of claim 1, wherein:
each logic tile further comprises a plurality of LUTs; and
the field-programmable configuration registers are further adapted to store a logical configuration for the plurality of LUTs and the TLC.

6. The TLFPGA of claim 5, further comprising a plurality of multiplexers (MUXs), wherein the field-programmable configuration registers are further adapted to store an intra-tile interconnection configuration between two or more of the plurality of LUTs and the TLC.

7. The TLFPGA of claim 6, wherein the field-programmable configuration registers are further adapted to store an inter-tile interconnection configuration between two or more of the plurality of logic tiles.

8. The TLFPGA of claim 1, wherein:
each logic tile further comprises a plurality of LUTs and a plurality of TLCs;
the field-programmable configuration registers are further adapted to store:
a first logical configuration for the plurality of LUTs and a first of the plurality of TLCs; and
a second logical configuration for a second of the plurality of TLCs.

9. The TLFPGA of claim 1, wherein:
each logic tile comprises eight LUTs and two TLCs; and
wherein each logic tile further comprises intra-tile interconnection resources configured to provide interconnections between the eight LUTs and the two TLCs according to the logical configuration stored in the field-programmable configuration registers.

10. A field-programmable integrated circuit, comprising:
a plurality of basic logic elements (BLEs), comprising at least one threshold logic cell (TLC) programmable to perform a Boolean threshold function and a plurality of lookup tables (LUTs);
a plurality of multiplexers providing programmable interconnection between the plurality of BLEs; and
configuration registers configured to program the plurality of BLEs and the plurality of multiplexers to perform a logic function;
wherein:
the at least one TLC is programmable as an output of a logic cone that drives a flip-flop; and
the logic cone comprises the plurality of LUTs and the at least one TLC.

11. The field-programmable integrated circuit of claim 10, wherein the plurality of BLEs is programmable to perform arbitrary Boolean logic functions.

12. The field-programmable integrated circuit of claim 10, wherein the plurality of BLEs further comprises one or more programmable digital signal processor (DSP) blocks.

13. A method for programming a threshold logic field-programmable gate array (TLFPGA), comprising:
obtaining a gate level netlist for a circuit design;
performing a threshold logic cell (TLC) mapping of the gate level netlist to produce a TLC-mapped gate level netlist by, at a given flip-flop:
searching a cone of logic feeding the flip-flop for a Boolean threshold function which can replace the flip-flop and a portion of the cone of logic; and
determining whether a cost of implementing the Boolean threshold function is less than the cone of logic and the flip-flop; and
performing a lookup table (LUT) mapping of the TLC-mapped gate level netlist.

14. The method of claim 13, further comprising generating a bitstream program for the TLFPGA.

15. The method of claim 14, further comprising programming the TLFPGA with the bitstream program.

* * * * *